(12) United States Patent
Walsh et al.

(10) Patent No.: US 7,779,004 B1
(45) Date of Patent: Aug. 17, 2010

(54) METHODS, SYSTEMS, AND PRODUCTS FOR CHARACTERIZING TARGET SYSTEMS

(75) Inventors: Richard J. Walsh, Raleigh, NC (US); Alfredo C. Issa, Apex, NC (US); Christopher M. Amidon, Apex, NC (US)

(73) Assignee: QURIO Holdings, Inc., Raleigh, NC (US)

( * ) Notice: Subject to any disclaimer, the term of this patent is extended or adjusted under 35 U.S.C. 154(b) by 356 days.

(21) Appl. No.: 11/359,632

(22) Filed: Feb. 22, 2006

(51) Int. Cl.
*G06F 7/00* (2006.01)

(52) U.S. Cl. ..................... 707/734; 707/794
(58) Field of Classification Search ............... None
See application file for complete search history.

(56) References Cited

U.S. PATENT DOCUMENTS

| | | | |
|---|---|---|---|
| 5,109,482 A | 4/1992 | Bohrman | |
| 5,220,657 A | 6/1993 | Bly et al. | |
| 5,309,359 A | 5/1994 | Katz et al. | |
| 5,404,295 A | 4/1995 | Katz et al. | |
| 5,600,775 A | 2/1997 | King et al. | |
| 5,625,833 A | 4/1997 | Levine et al. | |
| 5,629,980 A | 5/1997 | Stefik et al. | |
| 5,717,923 A | 2/1998 | Dedrick | |
| 5,736,982 A | 4/1998 | Suzuki et al. | |
| 5,749,081 A | 5/1998 | Whiteis | |
| 5,754,939 A * | 5/1998 | Herz et al. | 455/3.04 |
| 5,867,799 A | 2/1999 | Lang et al. | |
| 5,884,035 A | 3/1999 | Butman et al. | |
| 5,923,330 A | 7/1999 | Tarlton et al. | |
| 5,983,214 A | 11/1999 | Lang et al. | |
| 6,006,241 A | 12/1999 | Purnaveja et al. | |
| 6,073,138 A | 6/2000 | de l'Etraz et al. | |
| 6,088,702 A | 7/2000 | Plantz et al. | |
| 6,092,049 A | 7/2000 | Chislenko et al. | |
| 6,094,653 A | 7/2000 | Li et al. | |
| 6,151,624 A | 11/2000 | Teare et al. | |
| 6,167,441 A * | 12/2000 | Himmel | 709/217 |
| 6,173,287 B1 | 1/2001 | Eberman et al. | |
| 6,173,317 B1 | 1/2001 | Chaddha et al. | |

(Continued)

FOREIGN PATENT DOCUMENTS

EP 1 117 056 A2 7/2001

(Continued)

OTHER PUBLICATIONS

Srinivasan et al, OPSHNN: Ontology based Personalized Searching USing Hierarchiacal Neural Networks Evidence Combination, Sri Venkateswara College of Engineering, Spriderumbudur, India.*

(Continued)

*Primary Examiner*—Pierre M Vital
*Assistant Examiner*—Augustine Obisesan
(74) *Attorney, Agent, or Firm*—Withrow & Terranova, PLLC

(57) ABSTRACT

Methods, systems, and products are disclosed for characterizing a target system. A query is sent. The query includes an ontology of interest, a predicate, and a scoring algorithm. The predicate describes a membership qualification for a node in the ontology of interest. A response is received comprising a score. The score represents an evaluation of the predicate to metadata associated with the target system. The score represents how well the metadata matches the ontology of interest.

17 Claims, 12 Drawing Sheets

U.S. PATENT DOCUMENTS

| | | | |
|---|---|---|---|
| 6,182,808 B1 * | 2/2001 | Walton et al. | 192/35 |
| 6,195,696 B1 | 2/2001 | Baber et al. | |
| 6,247,002 B1 | 6/2001 | Steels | |
| 6,256,043 B1 | 7/2001 | Aho et al. | |
| 6,275,819 B1 | 8/2001 | Carter | |
| 6,308,175 B1 | 10/2001 | Lang et al. | |
| 6,311,194 B1 | 10/2001 | Sheth et al. | |
| 6,314,409 B2 | 11/2001 | Schneck et al. | |
| 6,327,590 B1 * | 12/2001 | Chidlovskii et al. | 707/5 |
| 6,332,144 B1 | 12/2001 | deVries et al. | |
| 6,338,086 B1 | 1/2002 | Curtis et al. | |
| 6,356,879 B2 * | 3/2002 | Aggarwal et al. | 705/26 |
| 6,374,290 B1 | 4/2002 | Scharber et al. | |
| 6,385,619 B1 | 5/2002 | Eichstaedt et al. | |
| 6,389,409 B1 | 5/2002 | Horovitz et al. | |
| 6,389,541 B1 | 5/2002 | Patterson | |
| 6,421,439 B1 | 7/2002 | Liffick | |
| 6,438,579 B1 | 8/2002 | Hosken | |
| 6,442,693 B1 | 8/2002 | Sandgren et al. | |
| 6,457,010 B1 * | 9/2002 | Eldering et al. | 707/10 |
| 6,463,433 B1 | 10/2002 | Baclawski | |
| 6,480,885 B1 | 11/2002 | Olivier | |
| 6,493,703 B1 | 12/2002 | Knight et al. | |
| 6,498,795 B1 | 12/2002 | Zhang et al. | |
| 6,519,629 B2 | 2/2003 | Harvey et al. | |
| 6,525,747 B1 | 2/2003 | Bezos | |
| 6,526,411 B1 | 2/2003 | Ward | |
| 6,539,375 B2 | 3/2003 | Kawasaki | |
| 6,546,405 B2 | 4/2003 | Gupta et al. | |
| 6,553,367 B2 | 4/2003 | Horovitz et al. | |
| 6,560,578 B2 | 5/2003 | Eldering | |
| 6,564,263 B1 | 5/2003 | Bergman et al. | |
| 6,567,122 B1 | 5/2003 | Anderson et al. | |
| 6,581,072 B1 * | 6/2003 | Mathur et al. | 707/104.1 |
| 6,594,693 B1 | 7/2003 | Borwankar | |
| 6,606,644 B1 | 8/2003 | Ford et al. | |
| 6,610,105 B1 * | 8/2003 | Martin et al. | 715/202 |
| 6,629,100 B2 | 9/2003 | Morris et al. | |
| 6,629,136 B1 | 9/2003 | Naidoo | |
| 6,630,944 B1 | 10/2003 | Kakuta et al. | |
| 6,631,098 B2 | 10/2003 | Chang et al. | |
| 6,651,086 B1 | 11/2003 | Manber et al. | |
| 6,654,735 B1 | 11/2003 | Eichstaedt et al. | |
| 6,672,961 B1 | 1/2004 | Uzun | |
| 6,675,159 B1 | 1/2004 | Lin et al. | |
| 6,687,732 B1 | 2/2004 | Bector et al. | |
| 6,701,362 B1 * | 3/2004 | Subramonian et al. | 709/224 |
| 6,725,259 B1 * | 4/2004 | Bharat | 709/219 |
| 6,738,764 B2 * | 5/2004 | Mao et al. | 707/5 |
| 6,744,922 B1 | 6/2004 | Walker | |
| 6,745,178 B1 | 6/2004 | Emens et al. | |
| 6,748,420 B1 | 6/2004 | Quatrano et al. | |
| 6,757,517 B2 | 6/2004 | Chang | |
| 6,772,160 B2 | 8/2004 | Cho et al. | |
| 6,785,704 B1 | 8/2004 | McCanne | |
| 6,816,906 B1 | 11/2004 | Icken et al. | |
| 6,832,245 B1 | 12/2004 | Isaacs et al. | |
| 6,839,680 B1 | 1/2005 | Liu et al. | |
| 6,854,012 B1 | 2/2005 | Taylor | |
| 6,854,069 B2 | 2/2005 | Kampe et al. | |
| 6,859,807 B1 | 2/2005 | Knight et al. | |
| 6,917,944 B1 | 7/2005 | Prasad et al. | |
| 6,948,131 B1 | 9/2005 | Neven et al. | |
| 6,957,193 B2 | 10/2005 | Stefik et al. | |
| 6,959,290 B2 | 10/2005 | Stefik et al. | |
| 6,970,444 B2 | 11/2005 | Chwieseni et al. | |
| 6,970,840 B1 | 11/2005 | Yu et al. | |
| 6,980,993 B2 | 12/2005 | Horvitz et al. | |
| 6,988,096 B2 | 1/2006 | Gupta et al. | |
| 6,988,127 B2 | 1/2006 | Matsuda et al. | |
| 6,993,564 B2 | 1/2006 | Whitten, II | |
| 7,016,307 B2 | 3/2006 | Vasudev et al. | |
| 7,024,391 B2 | 4/2006 | Burich | |
| 7,039,639 B2 | 5/2006 | Brezin et al. | |
| 7,043,644 B2 | 5/2006 | DeBruine | |
| 7,047,202 B2 | 5/2006 | Jaipuria et al. | |
| 7,047,406 B2 | 5/2006 | Schleicher et al. | |
| 7,051,003 B1 | 5/2006 | Kobata et al. | |
| 7,054,900 B1 * | 5/2006 | Goldston | 709/203 |
| 7,058,606 B2 | 6/2006 | Stefik et al. | |
| 7,058,897 B2 | 6/2006 | Matsuda | |
| 7,065,579 B2 | 6/2006 | Traversat et al. | |
| 7,069,308 B2 | 6/2006 | Abrams | |
| 7,103,634 B1 | 9/2006 | Ullmann et al. | |
| 7,107,317 B2 | 9/2006 | Demsky et al. | |
| 7,117,254 B2 | 10/2006 | Lunt et al. | |
| 7,150,030 B1 * | 12/2006 | Eldering et al. | 725/46 |
| 7,197,126 B2 | 3/2007 | Kanada | |
| 7,248,677 B2 | 7/2007 | Randall et al. | |
| 7,302,429 B1 * | 11/2007 | Wanker | 707/7 |
| 7,359,894 B1 | 4/2008 | Liebman et al. | |
| 7,370,015 B2 | 5/2008 | Gvily | |
| 7,372,991 B2 | 5/2008 | Chen et al. | |
| 7,396,281 B2 | 7/2008 | Mendelsohn et al. | |
| 7,599,983 B2 | 10/2009 | Harper et al. | |
| 7,614,016 B2 | 11/2009 | Wong et al. | |
| 2001/0007099 A1 | 7/2001 | Rau et al. | |
| 2001/0021920 A1 | 9/2001 | Ikeda | |
| 2001/0042043 A1 | 11/2001 | Shear et al. | |
| 2002/0032634 A1 | 3/2002 | Abrams et al. | |
| 2002/0033848 A1 | 3/2002 | Sciammarella et al. | |
| 2002/0052885 A1 | 5/2002 | Levy | |
| 2002/0057284 A1 | 5/2002 | Dalby et al. | |
| 2002/0059290 A1 | 5/2002 | Rising, III | |
| 2002/0072922 A1 | 6/2002 | Suzuki et al. | |
| 2002/0077985 A1 | 6/2002 | Kobata et al. | |
| 2002/0078206 A1 | 6/2002 | Boies et al. | |
| 2002/0085031 A1 | 7/2002 | Conrado et al. | |
| 2002/0091556 A1 | 7/2002 | Fiala et al. | |
| 2002/0091667 A1 | 7/2002 | Jaipuria et al. | |
| 2002/0091975 A1 | 7/2002 | Redlich et al. | |
| 2002/0113820 A1 | 8/2002 | Robinson et al. | |
| 2002/0116466 A1 | 8/2002 | Trevithick et al. | |
| 2002/0124053 A1 | 9/2002 | Adams et al. | |
| 2002/0138744 A1 | 9/2002 | Schleicher et al. | |
| 2002/0151327 A1 | 10/2002 | Levitt | |
| 2002/0152322 A1 | 10/2002 | Hay | |
| 2002/0156875 A1 | 10/2002 | Pabla | |
| 2002/0156917 A1 | 10/2002 | Nye | |
| 2002/0169737 A1 | 11/2002 | Armstrong et al. | |
| 2002/0178164 A1 | 11/2002 | Wisniewski | |
| 2002/0184357 A1 | 12/2002 | Traversat et al. | |
| 2003/0002521 A1 | 1/2003 | Traversat et al. | |
| 2003/0005439 A1 | 1/2003 | Rovira | |
| 2003/0009423 A1 | 1/2003 | Wang et al. | |
| 2003/0014482 A1 | 1/2003 | Toyota et al. | |
| 2003/0018582 A1 | 1/2003 | Yaacovi | |
| 2003/0018968 A1 | 1/2003 | Avnet | |
| 2003/0028451 A1 | 2/2003 | Ananian | |
| 2003/0028596 A1 | 2/2003 | Toyota et al. | |
| 2003/0028639 A1 | 2/2003 | Yamamoto et al. | |
| 2003/0050976 A1 | 3/2003 | Block et al. | |
| 2003/0050977 A1 | 3/2003 | Puthenkulam et al. | |
| 2003/0051255 A1 | 3/2003 | Bulman et al. | |
| 2003/0061028 A1 | 3/2003 | Dey et al. | |
| 2003/0061282 A1 | 3/2003 | Ebata et al. | |
| 2003/0078858 A1 | 4/2003 | Angelopoulos et al. | |
| 2003/0079120 A1 | 4/2003 | Hearn et al. | |
| 2003/0079177 A1 | 4/2003 | Brintzenhofe et al. | |
| 2003/0084162 A1 | 5/2003 | Johnson et al. | |
| 2003/0093520 A1 | 5/2003 | Beesley | |
| 2003/0101449 A1 | 5/2003 | Bentolila et al. | |
| 2003/0105812 A1 | 6/2003 | Flowers, Jr. et al. | |
| 2003/0110056 A1 * | 6/2003 | Berghofer et al. | 705/1 |

| Publication No. | Date | Inventor |
|---|---|---|
| 2003/0112823 A1 | 6/2003 | Collins et al. |
| 2003/0120662 A1 | 6/2003 | Vishik |
| 2003/0120680 A1 | 6/2003 | Agrawal et al. |
| 2003/0135468 A1 | 7/2003 | Barbir et al. |
| 2003/0135576 A1 | 7/2003 | Bodin |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0174178 A1 | 9/2003 | Hodges |
| 2003/0179228 A1 | 9/2003 | Schreiber et al. |
| 2003/0191776 A1 | 10/2003 | Obrador |
| 2003/0191814 A1* | 10/2003 | Tran .................. 709/217 |
| 2003/0195851 A1 | 10/2003 | Ong |
| 2003/0195924 A1 | 10/2003 | Franke et al. |
| 2003/0200190 A1 | 10/2003 | Adar et al. |
| 2003/0204605 A1 | 10/2003 | Hudson et al. |
| 2003/0220975 A1 | 11/2003 | Malik |
| 2003/0220980 A1 | 11/2003 | Crane |
| 2003/0226142 A1 | 12/2003 | Rand |
| 2003/0237085 A1 | 12/2003 | Boston et al. |
| 2004/0003413 A1 | 1/2004 | Boston et al. |
| 2004/0010483 A1 | 1/2004 | Brands et al. |
| 2004/0015553 A1 | 1/2004 | Griffin et al. |
| 2004/0015562 A1 | 1/2004 | Harper et al. |
| 2004/0019846 A1 | 1/2004 | Castellani et al. |
| 2004/0024720 A1 | 2/2004 | Fairweather |
| 2004/0024892 A1 | 2/2004 | Creswell et al. |
| 2004/0032393 A1 | 2/2004 | Brandenberg et al. |
| 2004/0039913 A1 | 2/2004 | Kruse |
| 2004/0044774 A1 | 3/2004 | Mangalik et al. |
| 2004/0054672 A1 | 3/2004 | Tsuchitani et al. |
| 2004/0054723 A1 | 3/2004 | Dayal et al. |
| 2004/0059705 A1 | 3/2004 | Wittke et al. |
| 2004/0064416 A1 | 4/2004 | Peled et al. |
| 2004/0078432 A1 | 4/2004 | Manber et al. |
| 2004/0081105 A1 | 4/2004 | Shimazaki et al. |
| 2004/0088325 A1 | 5/2004 | Elder et al. |
| 2004/0098754 A1 | 5/2004 | Vella et al. |
| 2004/0101272 A1 | 5/2004 | Boston et al. |
| 2004/0103044 A1 | 5/2004 | Vandewater et al. |
| 2004/0111750 A1 | 6/2004 | Stuckman et al. |
| 2004/0117367 A1 | 6/2004 | Smith et al. |
| 2004/0122822 A1 | 6/2004 | Thompson et al. |
| 2004/0122855 A1 | 6/2004 | Ruvolo et al. |
| 2004/0137882 A1 | 7/2004 | Forsyth |
| 2004/0148275 A1 | 7/2004 | Achlioptas |
| 2004/0148503 A1 | 7/2004 | Sidman |
| 2004/0154040 A1 | 8/2004 | Ellis |
| 2004/0162871 A1 | 8/2004 | Pabla et al. |
| 2004/0170321 A1 | 9/2004 | Gong et al. |
| 2004/0181487 A1 | 9/2004 | Hanson |
| 2004/0193673 A1 | 9/2004 | Samji et al. |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220893 A1 | 11/2004 | Spivack et al. |
| 2004/0237045 A1 | 11/2004 | Meltzer |
| 2004/0239681 A1 | 12/2004 | Robotham et al. |
| 2004/0240652 A1 | 12/2004 | Kanada |
| 2004/0249768 A1 | 12/2004 | Kontio et al. |
| 2004/0267625 A1 | 12/2004 | Feng et al. |
| 2005/0004930 A1 | 1/2005 | Hatta |
| 2005/0005300 A1 | 1/2005 | Putterman et al. |
| 2005/0010637 A1 | 1/2005 | Dempski et al. |
| 2005/0013298 A1 | 1/2005 | Srisuresh et al. |
| 2005/0015357 A1 | 1/2005 | Shahidi |
| 2005/0021096 A1 | 1/2005 | Mower |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0050578 A1 | 3/2005 | Ryal |
| 2005/0060743 A1 | 3/2005 | Ohnuma et al. |
| 2005/0076365 A1 | 4/2005 | Popov et al. |
| 2005/0086069 A1 | 4/2005 | Watson et al. |
| 2005/0091279 A1 | 4/2005 | Rising, III |
| 2005/0091289 A1 | 4/2005 | Shappell et al. |
| 2005/0091316 A1 | 4/2005 | Ponce et al. |
| 2005/0094313 A1 | 5/2005 | Kim |
| 2005/0097170 A1 | 5/2005 | Zhu et al. |
| 2005/0114783 A1 | 5/2005 | Szeto |
| 2005/0120386 A1 | 6/2005 | Stone |
| 2005/0131762 A1 | 6/2005 | Bharat et al. |
| 2005/0138430 A1 | 6/2005 | Landsman |
| 2005/0149510 A1 | 7/2005 | Shafrir |
| 2005/0149621 A1 | 7/2005 | Kirkland et al. |
| 2005/0154701 A1 | 7/2005 | Parunak et al. |
| 2005/0159970 A1 | 7/2005 | Buyukkokten et al. |
| 2005/0159998 A1 | 7/2005 | Buyukkokten et al. |
| 2005/0163135 A1 | 7/2005 | Hopkins |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198305 A1 | 9/2005 | Pezaris et al. |
| 2005/0201290 A1 | 9/2005 | Vasudev et al. |
| 2005/0203801 A1 | 9/2005 | Morgenstern et al. |
| 2005/0204038 A1 | 9/2005 | Medvinsky et al. |
| 2005/0209999 A1 | 9/2005 | Jou |
| 2005/0210104 A1 | 9/2005 | Torvinen |
| 2005/0210387 A1 | 9/2005 | Alagappan et al. |
| 2005/0210409 A1 | 9/2005 | Jou |
| 2005/0215660 A1 | 9/2005 | Tomikawa et al. |
| 2005/0216300 A1 | 9/2005 | Appelman et al. |
| 2005/0216443 A1 | 9/2005 | Morton et al. |
| 2005/0216550 A1 | 9/2005 | Paseman et al. |
| 2005/0226511 A1 | 10/2005 | Short |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0234958 A1 | 10/2005 | Sipusic et al. |
| 2005/0235062 A1 | 10/2005 | Lunt et al. |
| 2005/0235336 A1 | 10/2005 | Ma |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0256756 A1 | 11/2005 | Lam et al. |
| 2005/0256866 A1 | 11/2005 | Lu et al. |
| 2005/0256909 A1 | 11/2005 | Aboulhosn et al. |
| 2005/0262162 A1 | 11/2005 | Levy |
| 2005/0262199 A1 | 11/2005 | Chen et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0283497 A1 | 12/2005 | Nurminen et al. |
| 2005/0289179 A1 | 12/2005 | Naphade et al. |
| 2005/0289648 A1 | 12/2005 | Grobman et al. |
| 2006/0004789 A1 | 1/2006 | Lunt et al. |
| 2006/0004892 A1 | 1/2006 | Lunt et al. |
| 2006/0010225 A1 | 1/2006 | Issa |
| 2006/0015588 A1 | 1/2006 | Achlioptas et al. |
| 2006/0020960 A1 | 1/2006 | Relan et al. |
| 2006/0021009 A1 | 1/2006 | Lunt |

| | | | |
|---|---|---|---|
| 2006/0026235 A1 | 2/2006 | Schwarz et al. | |
| 2006/0031217 A1 | 2/2006 | Smith et al. | |
| 2006/0031489 A1 | 2/2006 | Marcjan | |
| 2006/0031770 A1 | 2/2006 | McMenamin | |
| 2006/0035766 A1 | 2/2006 | Towley, III et al. | |
| 2006/0036641 A1 | 2/2006 | Brydon et al. | |
| 2006/0036766 A1 | 2/2006 | Baupin et al. | |
| 2006/0042483 A1 | 3/2006 | Work et al. | |
| 2006/0047635 A1* | 3/2006 | Kraenzel et al. | 707/3 |
| 2006/0047839 A1 | 3/2006 | Tate et al. | |
| 2006/0048059 A1 | 3/2006 | Etkin | |
| 2006/0053380 A1 | 3/2006 | Spataro et al. | |
| 2006/0059260 A1 | 3/2006 | Kelly et al. | |
| 2006/0064411 A1* | 3/2006 | Gross et al. | 707/3 |
| 2006/0064431 A1 | 3/2006 | Kishore et al. | |
| 2006/0064645 A1 | 3/2006 | Neven et al. | |
| 2006/0085248 A1 | 4/2006 | Arnett et al. | |
| 2006/0085818 A1 | 4/2006 | Bodlaender et al. | |
| 2006/0089913 A1 | 4/2006 | Jaipuria et al. | |
| 2006/0090137 A1 | 4/2006 | Cheng et al. | |
| 2006/0095514 A1 | 5/2006 | Wang et al. | |
| 2006/0095792 A1 | 5/2006 | Hurtado et al. | |
| 2006/0095976 A1 | 5/2006 | Torres et al. | |
| 2006/0107286 A1 | 5/2006 | Connor et al. | |
| 2006/0112111 A1 | 5/2006 | Tseng et al. | |
| 2006/0117090 A1 | 6/2006 | Schellingerhout et al. | |
| 2006/0117378 A1 | 6/2006 | Tam et al. | |
| 2006/0121987 A1 | 6/2006 | Bortnik et al. | |
| 2006/0121988 A1 | 6/2006 | Reville et al. | |
| 2006/0123127 A1 | 6/2006 | Littlefield | |
| 2006/0136419 A1 | 6/2006 | Brydon et al. | |
| 2006/0136551 A1 | 6/2006 | Amidon et al. | |
| 2006/0143067 A1 | 6/2006 | Calabria | |
| 2006/0143068 A1 | 6/2006 | Calabria | |
| 2006/0143183 A1 | 6/2006 | Goldberg et al. | |
| 2006/0143236 A1 | 6/2006 | Wu | |
| 2006/0146765 A1 | 7/2006 | Van De Sluis et al. | |
| 2006/0148512 A1 | 7/2006 | Ekholm et al. | |
| 2006/0155813 A1 | 7/2006 | Dietz et al. | |
| 2006/0161553 A1 | 7/2006 | Woo | |
| 2006/0161635 A1 | 7/2006 | Lamkin et al. | |
| 2006/0167804 A1 | 7/2006 | Aydar et al. | |
| 2006/0167855 A1 | 7/2006 | Ishikawa et al. | |
| 2006/0173838 A1 | 8/2006 | Garg et al. | |
| 2006/0173957 A1 | 8/2006 | Robinson et al. | |
| 2006/0173963 A1 | 8/2006 | Roseway et al. | |
| 2006/0173985 A1 | 8/2006 | Moore | |
| 2006/0184464 A1 | 8/2006 | Tseng et al. | |
| 2006/0184579 A1 | 8/2006 | Mills et al. | |
| 2006/0184997 A1 | 8/2006 | La Rotonda et al. | |
| 2006/0190524 A1 | 8/2006 | Bethke et al. | |
| 2006/0190536 A1 | 8/2006 | Strong et al. | |
| 2006/0195441 A1 | 8/2006 | Julia et al. | |
| 2006/0195462 A1 | 8/2006 | Rogers | |
| 2006/0195515 A1 | 8/2006 | Beaupre et al. | |
| 2006/0200434 A1 | 9/2006 | Flinn et al. | |
| 2006/0200435 A1 | 9/2006 | Flinn et al. | |
| 2006/0209727 A1 | 9/2006 | Jennings, III et al. | |
| 2006/0218153 A1 | 9/2006 | Voon et al. | |
| 2006/0218225 A1 | 9/2006 | Hee Voon et al. | |
| 2006/0218577 A1 | 9/2006 | Goodman et al. | |
| 2006/0242234 A1 | 10/2006 | Counts et al. | |
| 2006/0242581 A1 | 10/2006 | Manion et al. | |
| 2006/0248573 A1 | 11/2006 | Pannu et al. | |
| 2006/0259733 A1 | 11/2006 | Yamazaki et al. | |
| 2006/0267940 A1 | 11/2006 | Groom et al. | |
| 2006/0271997 A1 | 11/2006 | Jacoby et al. | |
| 2006/0272015 A1 | 11/2006 | Frank et al. | |
| 2006/0277474 A1 | 12/2006 | Robarts et al. | |
| 2006/0282391 A1 | 12/2006 | Peterka et al. | |
| 2007/0013701 A1 | 1/2007 | Segawa et al. | |
| 2007/0106627 A1 | 5/2007 | Srivastava et al. | |
| 2007/0127889 A1 | 6/2007 | Seo | |
| 2007/0184855 A1 | 8/2007 | Klassen et al. | |
| 2007/0198364 A1 | 8/2007 | Quoc et al. | |

FOREIGN PATENT DOCUMENTS

| | | |
|---|---|---|
| EP | 1 338 966 A3 | 8/2003 |
| EP | 1 675 060 A1 | 6/2006 |
| WO | WO 2005/111760 A1 | 11/2005 |
| WO | WO 2006/036165 A2 | 4/2006 |
| WO | WO 2006/041425 A2 | 4/2006 |

OTHER PUBLICATIONS

Pretchner et al, Ontology Based Personalized Search, Technische Universitat Munvhen, ArcisstraB2 21, Germany & University of Kansas, USA.*

No Author, Architecture of Windows Media Rights Manager, (website), May 2004, at www.microsoft.com/windows/windowsmedia/howto/articles/drmarchitecture.aspx, Relevant pp. 1-5.

No Author, FOAF Vocabulary Specification, (website), Jul. 27, 2005, at http://xmlns.com/foaf/0.1/, Relevant pp. 1-42.

No Author, The Case for a Hybrid P2P Search Infrastructure, (website), Feb. 26, 2004, at http://www.cs.berkeley.edu/~boonloo/research/pier/casehybrid_iptps.ppt, Relevant pp. 1-29.

No Author, Huminity—Social Networking, (website), Exact Date unknown, at http://www.huminity.com/english/software.html, Relevant pp. 1.

Belle T. Tseng et al., "Using MPEG-7 and MPEG-21 for Personalizing Video," (article), Jan.-Mar. 2004, pp. 45-52, IEEE Multimedia.

Xingquan Zhu et al., "Hierarchical video content description and summarization using unified semantic and visual similarity," (article), Jul. 2003, pp. 31-53, Multimedia Systems 9(1).

Wallapak Tavapong, "Shot Clustering Techniques for Story Browsing," (article), Aug. 2004, pp. 517-527, vol. 6, No. 4, IEEE Transactions on Multimedia.

No Author, Pidgin, (website), obtained Jul. 13, 2007 (unable to determine actual publication date), at http://pidgin.im/pidgin/home/, Relevant pp. 1.

No Author, MySpace, (website), obtained Apr. 10, 2008 (unable to determine actual publication date), at http://www.myspace.com, Relevant pp. 1-2.

No Author, ICQ, (website), obtained Jan. 16, 2008 (unable to determine actual publication date), at http://www.icq.com/, Relevant pp. 1-2.

No Author, Dijkstra's algorithm, (website), obtained Apr. 10, 2008 (unable to determine actual publication date), at http://en.wikipedia.org/wiki/Dijkstra's_algorithm, Relevant pp. 1-4.

No Author, Welcome to Facebook!, (website), obtained Apr. 10, 2008 (unable to determine actual publication date), at http://www.facebook.com/, Relevant pp. 1.

No Author, The Friend of a Fried (FOAF) Project, (website), obtained Feb. 2, 2007 (unable to determine actual publication date), at http://www.foaf-project.com, Relevant pp. 1.

No Author, Friendster—Home, (website), obtained Feb. 8, 2007 (unable to determine actual publication date), at http://www.friendster.com, Relevant pp. 1-2.

No Author, News—Gaim 1.5.0, (website), obtained Mar. 1, 2007 (unable to determine actual publication date), at http://www.gaim.sourceforge.net, Relevant pp. 1-3.

Bostjan Marusic et al., "Share It!—Content Transfer in Home-to-Home Networks," (article), May 12-15, 2004, pp. 669-672, IEEE Melecon 2004, Dubrovnik, Croatia.

Breen, Casey, et al., "Image Classification Using Neural Networks and Ontologies," (article), Sep. 2-6, 2002, pp. 98-102, IEEE Computer Society, Proceedings of the 13th International Workshop on Database and Expert Systems Applications.

No Author, "Information Technology—Multimedia Content Description Interface—Part 6: Reference Software," (website), Jun. 25, 2003, 2 pages, http://www.iso.ch/iso/en/CatalogueDetailPage.CatalogueDetail?CSNUMBER=35364&printable=true.

Johan Pouwelse et al., "P2P-based PVR Recommendation using Friends, Taste Buddies and Superpeers," (article), Jan. 2005, 6 pages, Beyond Personalization 2005, Workshop on the Next Stage of Recommender Systems Research, San Diego, USA.

M.E.J. Newman, "The Mathematics of networks," (chapter), 12 pages, 2008, in The New Palgrave Encyclopedia of Economics, 2nd edition, L. E. Blume and S. N. Durlauf (eds.), Palgrave Macmillan, Basingstoke, http://www-personal.umich.edu/~mejn/papers/palgrave.pdf.

Ronald Schroeter et al., "FilmEd—Collaborative Video Indexing, Annotation and Discussion Tools Over Broadband Networks," (article), Jan. 5-7, 2004, pp. 346-353, In Proceedings of the 10th International Multimedia Modelling Conference, Brisbane, Australia, http://metadata.net/filmed/pub/MMM04_FilmEd.pdf.

Scott Carter et al., "Digital Graffiti: Public Annotation of Multimedia Content," (article), Apr. 24-29, 2004, 4 pages, CHI '04 extended abstracts on Human factors in computing systems, Vienna, Austria, http://www.madpickle.net/scott/pubs/lb651-carter.pdf.

No Author, "Welcome to Webbed Footnotes!," (website), obtained Jan. 4, 2007, 1 page, http://web.media.mit.edu/~golder/projects/webbedfootnotes/.

No Author, "Centrality—Wikipedia," (website), 3 pages, obtained Sep. 19, 2007, http://en.wikipedia.org/wiki/Eigenvector_Centrality.

No Author, "Centrality—Wikipedia," (website), 3 pages, obtained Sep. 19, 2007, http://en.wikipedia.org/wiki/Centrality.

Alexander Pretschner et al., "Ontology Based Personalized Search," (article), Nov. 8-10, 1999, p. 391, Proceedings of the 11th IEEE International Conference on Tools with Artificial Intelligence.

T. Srinivasan et al., "OPSHNN: Ontology Based Personalized Searching Using Hierarchical Neural Networks Evidence Combination," (article), Sep. 2006, p. 44, The Sixth IEEE International Conference on Computer and Information Technology 2006.

Ronald Schroeter et al., "FilmEd—Collaborative Video Indexing, Annotation and Discussion Tools Over Broadband Networks," (article), 2004, 29 pages, in International Conference on Multi-Media Modeling, Brisbane, Australia.

Deborah L. McGuinness et al., editors; "OWL Web Ontology Language—Overview", copyright 2004 World Wide Web Consortium (W3C), published Feb. 10, 2004, http://www.w3.org/TR/2004/REC-owl-features-20040210/, 19 pages.

Warren Sack, "Discourse Diagrams: Interface Design for Very Large-Scale Conversations," System Sciences, Proceedings of the 33rd Annual Hawaii International Conference, 2000.

Marc A. Smith and Andrew T. Fiore, "Visualization Components for Persistent Conversations," Sep. 2000.

Beverly Yang et al., "Designing a Super-Peer Network," 19th International Conference on Data Engineering (ICDE'03), 2003.

Smith, Steve; "Tapping the Feed: in search of an RSS Money Trail" Econtent; Mar. 2005; vol. 28, Issue 3; p. 30-34.

Krol, Carol; "RSS ad programs feed needs" B to B; Jul. 11, 2005; vol. 90 Issue 9; p. 1-33.

\* cited by examiner

METHODS, SYSTEMS, AND PRODUCTS FOR CHARACTERIZING TARGET SYSTEMS

BACKGROUND

This application particularly relates to characterizing a target system without revealing metadata and content selections stored on the target system, thus helping ensure the privacy of the target system.

Website operators personalize online experiences. There is so much digital information that websites need to ensure their content is relevant to a user. If content is not relevant to a user, then that content gets lost and unnoticed. Website operators, then, strive to personalize the user's online experience to ensure the content is meaningful.

Personalization, however, is mostly user defined. That is, websites permit the user to establish a profile, and the website is configured according to the user's profile. Website "cookies" are one example of profile information that is exchanged between a server and a browser. The user's profile, however, is usually defined by explicit controls, such as website options that permit the user to personalize a website with news, weather, sports, and other desired information. Some websites may even utilize passive systems that slowly establish, or learn, a user's profile. These passive systems may monitor web requests and learn, over time, what interests the user.

Personalization, however, can be improved. Computer users already have favored content on their communications devices. Users already store websites and content that interests them, so users have little incentive to personalize yet another website. Users also have great concerns about privacy, so users understandably want to limit access to their personal information. What is needed, then, are methods, systems, and products that improve personalization of online experiences, that personalize based on content and information already available on a user's computer or other communications device, and that maintain privacy of personal information,

SUMMARY

The problems noted above, along with other problems, may be reduced or eliminated by embodiments of the present invention using methods, systems, and products that characterize target systems. According to one aspect of the present invention, a third party may determine the interests of a computer user, based on the content and information already stored on the user's system. The third party, such as AMAZON® or EBAY®, is permitted to characterize a user's system, without revealing personal or private information. The third party may thus develop a profile of any target system, based primarily or only on the information associated with that target system. All the third party need do is send a query according to the exemplary embodiments. The response to that query contains a snapshot, hereinafter termed a "score," that characterizes the target system. The third party need not have access to any information stored on the target system. The privacy of the user's information is maintained.

According to another aspect, a method is disclosed for characterizing a target system. A query is sent. The query may include an ontology of interest, perhaps one or more predicates, and/or a scoring algorithm. Each predicate describes a membership qualification for a node in the ontology of interest. A response is received comprising a score. The score represents an evaluation of the predicate to metadata associated with the target system. The score represents how well the metadata matches the ontology of interest.

According to another aspect of the present invention, a system is disclosed for characterizing a target system. The system comprises a characterization application stored in memory, and a processor communicates with the memory. The processor sends a query, and the query may comprise an ontology of interest, zero or more predicates, and/or a scoring algorithm. Each predicate describes a membership qualification for a node in the ontology of interest. The processor receives a response comprising a score that represents an evaluation of the predicate to metadata associated with the target system. The score represents how well the metadata matches the ontology of interest.

In yet another aspect, a computer program product is disclosed that characterizes a target system. The computer program product comprises a computer-readable medium that stores processor-executable instructions. These instructions cause the processor to send a query. The query may comprise an ontology of interest, a predicate, and/or a scoring algorithm. Each predicate describes a membership qualification for a node in the ontology of interest. The processor receives a response comprising a score that represents an evaluation of the predicate to metadata associated with the target system. The score represents how well the metadata matches the ontology of interest.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
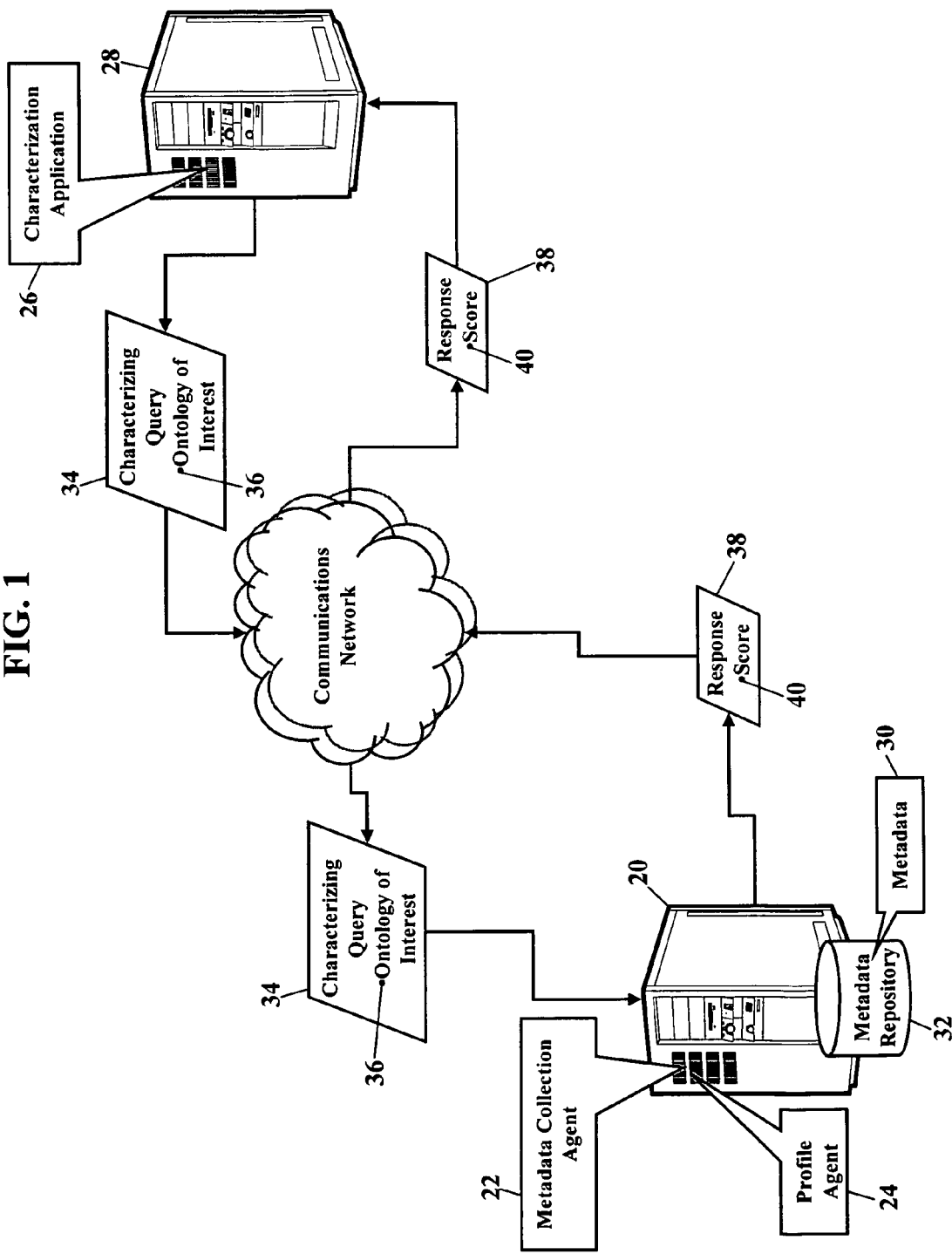
FIG. 1 is a simplified schematic illustrating systems for characterizing a target system.

FIG. 1 is a simplified schematic illustrating a network environment in which exemplary embodiments of the present invention may be implemented. FIG. 1 illustrates how the target system 20 may be characterized without revealing the actual content stored in the target system 20. That is, the present invention describes how content selections made via the target system 20 may be described, but those actual content selections may be kept inaccessible. FIG. 1 illustrates a metadata collection agent 22, a profile agent 24, and a characterization application 26. The metadata collection agent 22 and the profile agent 24 are computer programs that, in this embodiment, store within the target system 20. The characterization application 26 is a computer program that stores within a characterizing system 28. When a user of the target system 20 uses, acquires, and/or selects content, the metadata collection agent 22 collects metadata 30 associated with those content selections. The metadata collection agent 22 then stores that collected metadata 30 in a metadata repository 32. When a third party desires to characterize the user's content selections, the characterizing system 28 sends a characterization query 34. The characterization query 34 comprises an ontology 36 of interest to the third party. As the following paragraphs explain in more detail, the profile agent 24 receives the characterization query 34 and evaluates the collected metadata 30 stored in the metadata repository 32 against the ontology 36 of interest. The profile agent 24 then sends a response 38 sends a response 38 representative of the collected metadata. According to one embodiment, the response 38 representative of the collected metadata comprises a score 40 which represents how well the collected metadata 30 matches the ontology 36 of interest.

The user's privacy is maintained. The score 40 may be the only artifact received by third party's characterizing system 28. The third party understands and accepts that the actual metadata 30, stored in the metadata repository 32, is inaccessible to the third party sender of the characterization query 34. The profile agent 24 thus acts as a "middleman" to intercept the characterization query 34. The profile agent 24 compares and scores the collected metadata 30 to the third party's ontology 36 of interest. The user may configure the profile agent 24 to never divulge the exact metadata 30 stored in the metadata repository 32. The returned score 40 provides the third party with a snapshot of the user's interests, but the actual metadata 30 is inaccessible to the third party. Because the profile agent 24 acts as an intermediary, the target system 20 itself may be inaccessible to the third party. The target system's memory structure and storage devices may be inaccessible to the third party requestor, thus preserving the privacy of the user's metadata, content selections, and other information.

Figure 2:
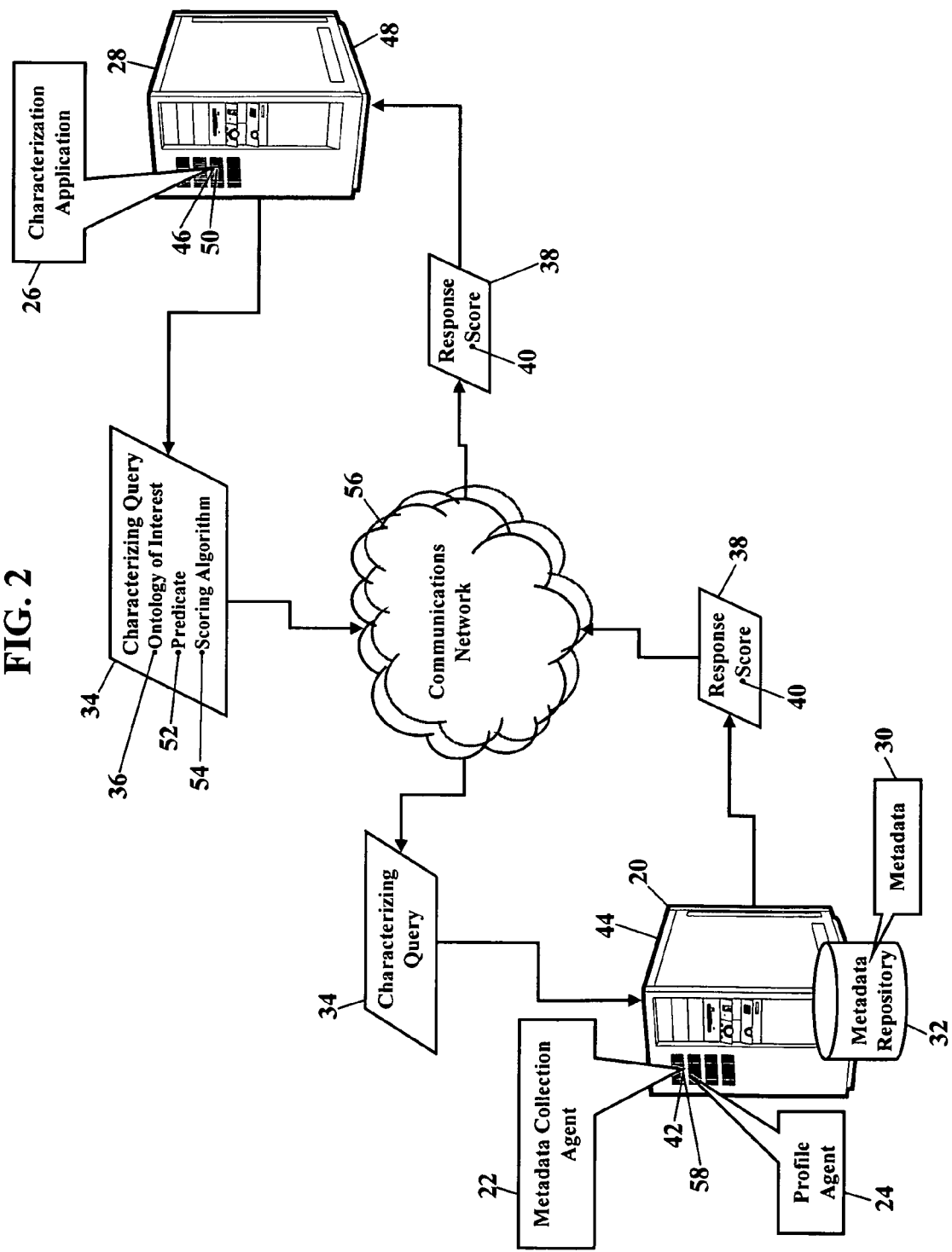
FIG. 2 is a more detailed schematic illustrating systems for characterizing the target system.

FIG. 2 is a more detailed schematic illustrating systems for characterizing the target system 20. The metadata collection agent 22 and the profile agent 24 again store within memory 42 of the target system 20. Although the target system 20 is shown as a computer 44, later paragraphs will explain that the target system 20 may be any processor-controlled device. The characterization application 26 again stores within memory 46 of the characterizing system 28. The characterizing system 28 is shown as a computer server 48, yet the characterizing system 28 may also be any processor-controlled device.

The characterizing system 28 sends the characterization query 34. The characterization application 26 includes code that instructs a characterizing processor 50 to formulate and to issue the characterization query 34. Here, however, the characterization query 34 may comprise the ontology 36 of interest, a predicate 52, and/or a scoring algorithm 54. Each predicate 52 describes a membership qualification for a node in the ontology 36 of interest. Each ontological node may have zero predicates, a single predicate, or a collection of predicates. The characterization query 34 communicates via a communications network 56 to the profile agent 24. When the profile agent 24 receives the characterization query 34, the profile agent 24 includes code that instructs a target processor 58 to evaluate the predicate 52 to the collected metadata 30 stored in the metadata repository 32. The profile agent 24 then instructs the target processor 58 to apply the scoring algorithm 54 and produce the score 40. The profile agent 24 instructs the target processor 58 to send the response 38, and the response 38 includes the score 40. The score 40 represents how well the collected metadata 30 matches the ontology 36 of interest, as defined by the scoring algorithm 54. The response 38 is addressed to the characterizing system 28 and communicates via the communications network 56. The third party's characterizing system 28 may then evaluate the score 40 to determine the user's interests, relative to the ontology 36 of interest.

The third party may provide the ontology 36 of interest. As FIG. 2 illustrates, the sender of the characterization query 34 may provide the ontology 36 of interest with the characterization query 34. As those of ordinary skill in the art understand, an ontology defines terms and concepts that describe and represent the third party's domain of interest. The ontology 36 of interest may be described in any language or format. The ontology 36 of interest, for example, may be expressed using WC3's OWL Web Ontology Language, DAML+OIL, RDF, and any other language. The ontology 36 of interest may additionally or alternatively expressed using other structures, such as a taxonomy or as simple as a list of concepts. Because ontologies are well known to those of ordinary skill in the art, this specification will not greatly describe the known aspects of the ontology 36 of interest. If, however, the reader desires more information, the reader is invited to consult the following sources, all of which are incorporated herein by reference in their entirety: W3C Recommendation, OWL Web Ontology Language—Overview, available from W3C, 32 Vassar Street, Room 32-G515, Cambridge, Mass. 02139 USA; U.S. Pat. No. 6,311,194 to Sheth et al. (Oct. 3, 2001); U.S. Pat. No. 6,498,795 to Zhang et al. (Dec. 24, 2002); U.S. Pat. No. 6,772,160 to Cho et al. (Aug. 3, 2004); Published U.S. Patent Application 2003/0120662 to Vishik (Jun. 26, 2003); Published U.S. Patent Application 2004/0220893 to Spivack et al. (Nov. 4, 2004); Published U.S. Patent Application 2005/0034107 to Kendall et al. (Feb. 10, 2005); and Published U.S. Patent Application 2005/0154701 to Parunak et al. (Jul. 14, 2005).

Figure 3:
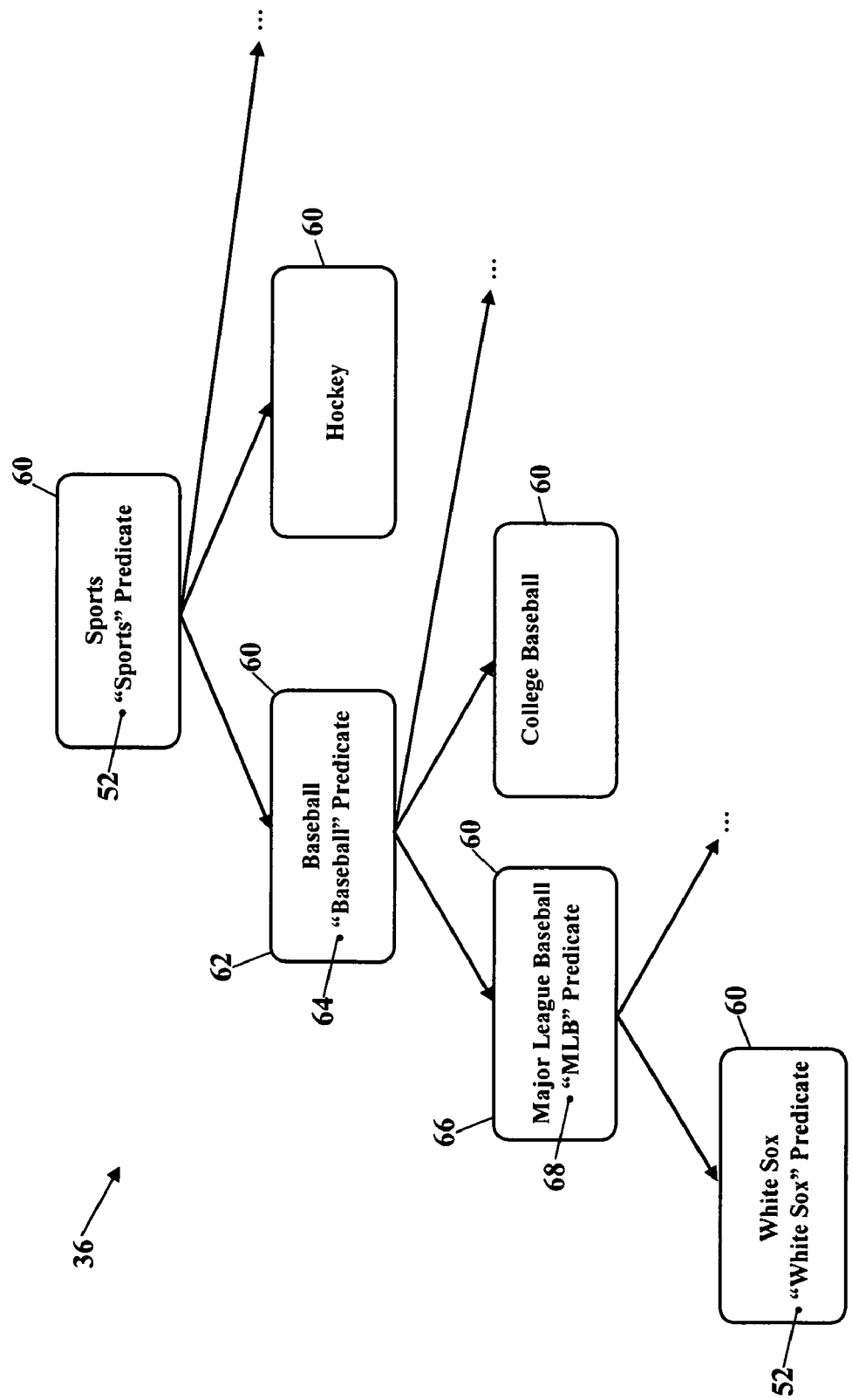
FIG. 3 is a schematic illustrating the ontology of interest.

FIG. 3 is a schematic illustrating the ontology 36 of interest, according to more aspects of the present invention. FIG. 3 illustrates a simple sports-oriented ontology, perhaps used by an online sports website. A large website, such as AMAZON® or EBAY®, may have a larger and more complicated ontology. The ontology 36 of interest may include one or more nodes 60, and each node may (or may not) include one or more associated predicates 52. Each predicate 52 describes a membership qualification for a particular node in the ontology 36 of interest. The profile agent uses each predicates 52 to query the metadata repository (the profile agent and the metadata repository are, respectively, shown as reference numerals 24 and 22 in FIGS. 1 and 2). The query results are then used by the scoring algorithm (shown as reference numeral 54 in FIG. 2) to quantify the presence of metadata (and therefore the user's interest) related to the respective ontological node 60. FIG. 3, for example, illustrates a "Baseball" node 62, and the baseball node 62 includes an associated baseball predicate 64. If the profile agent queries the user's metadata repository for the baseball predicate 64, then the resultant score determines the user's interest in "baseball." The baseball predicate 64 thus allows the third party to define meaning to the user's metadata with respect to the "Baseball" node 62.

FIG. 3 also illustrates a "Major League Baseball" node 66. The "Major League Baseball" node 66 also includes an associated major league baseball predicate 68. The major league baseball predicate 68 describes the qualifications for determining whether the user has an interest in major league baseball. Suppose, for example, the associated major league baseball predicate 68 has the following structure:

Node="Major League Baseball"
predicate=where type='browser' and keyword='history' and value like '%world%series%' and age<30 days
predicate=where type='browser' and keyword='history' and value like 'http://%.mlb.com/%'

Here the major league baseball predicate 68 is expressed as pseudo-SQL expressions. Each node's predicate 52, however, may comprise any query language, such as OMG's OQL, KQML, or any other knowledge query language. Here the third party requestor defines the major league baseball predicate 68 to determine whether the user has an interest in major league baseball. If the user's Internet browser history contains the search term "world series" within the previous thirty (30) days, then the third party defines the user as having an interest in major league baseball. If the user's Internet browser history contains the domain "mlb.com," then the third party defines the user as having an interest in major league baseball. The profile agent uses the major league baseball predicate 68 to query the metadata repository (the profile agent and the metadata repository are, respectively, shown as reference numerals 24 and 22 in FIGS. 1 and 2). The query results are then used by the scoring algorithm (shown as reference numeral 54 in FIG. 1) to quantify the user's interest in major league baseball.

Figure 4:
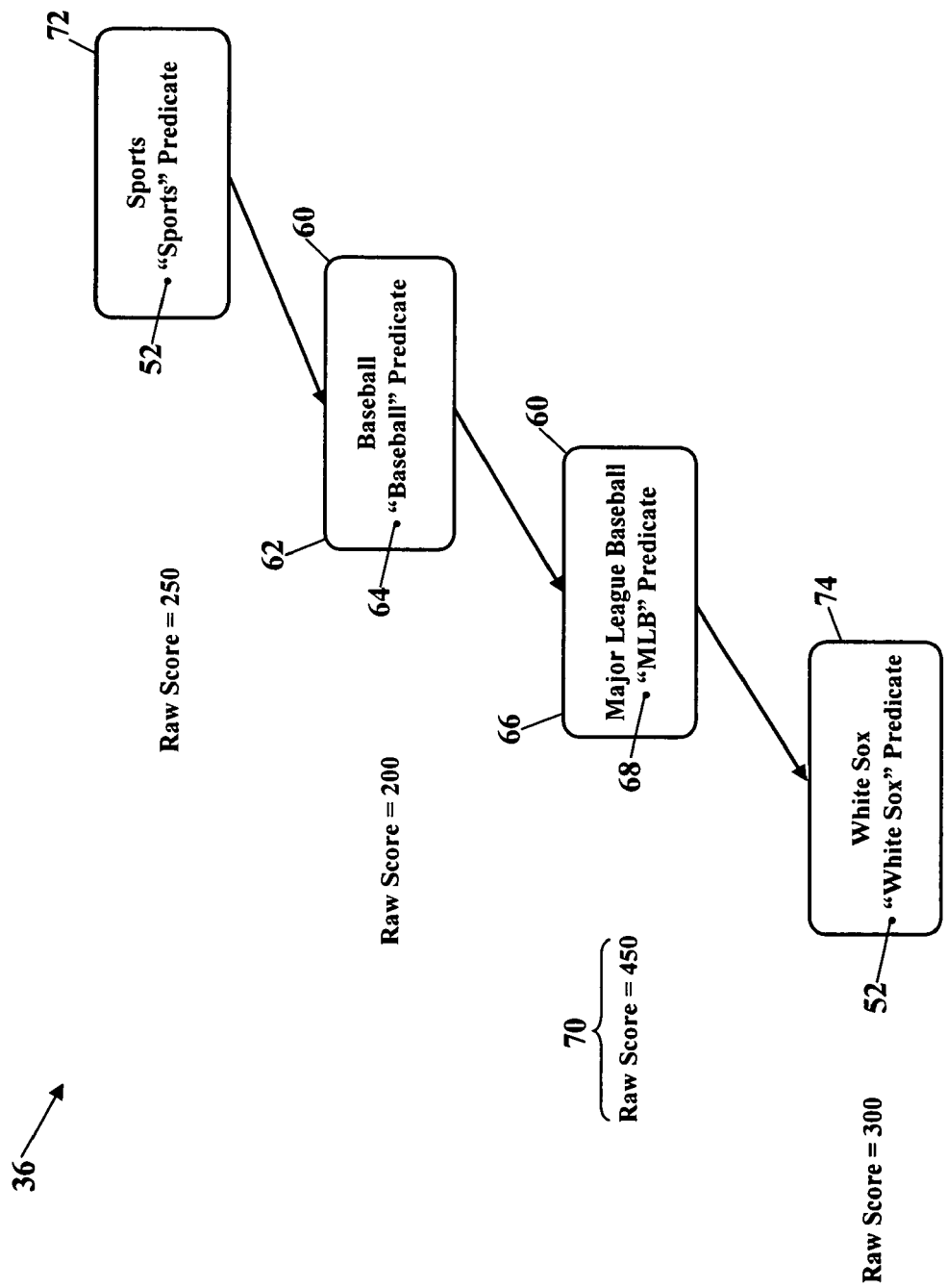
FIGS. 4 and 5 are additional schematics illustrating the ontology of interest.
Figure 5:
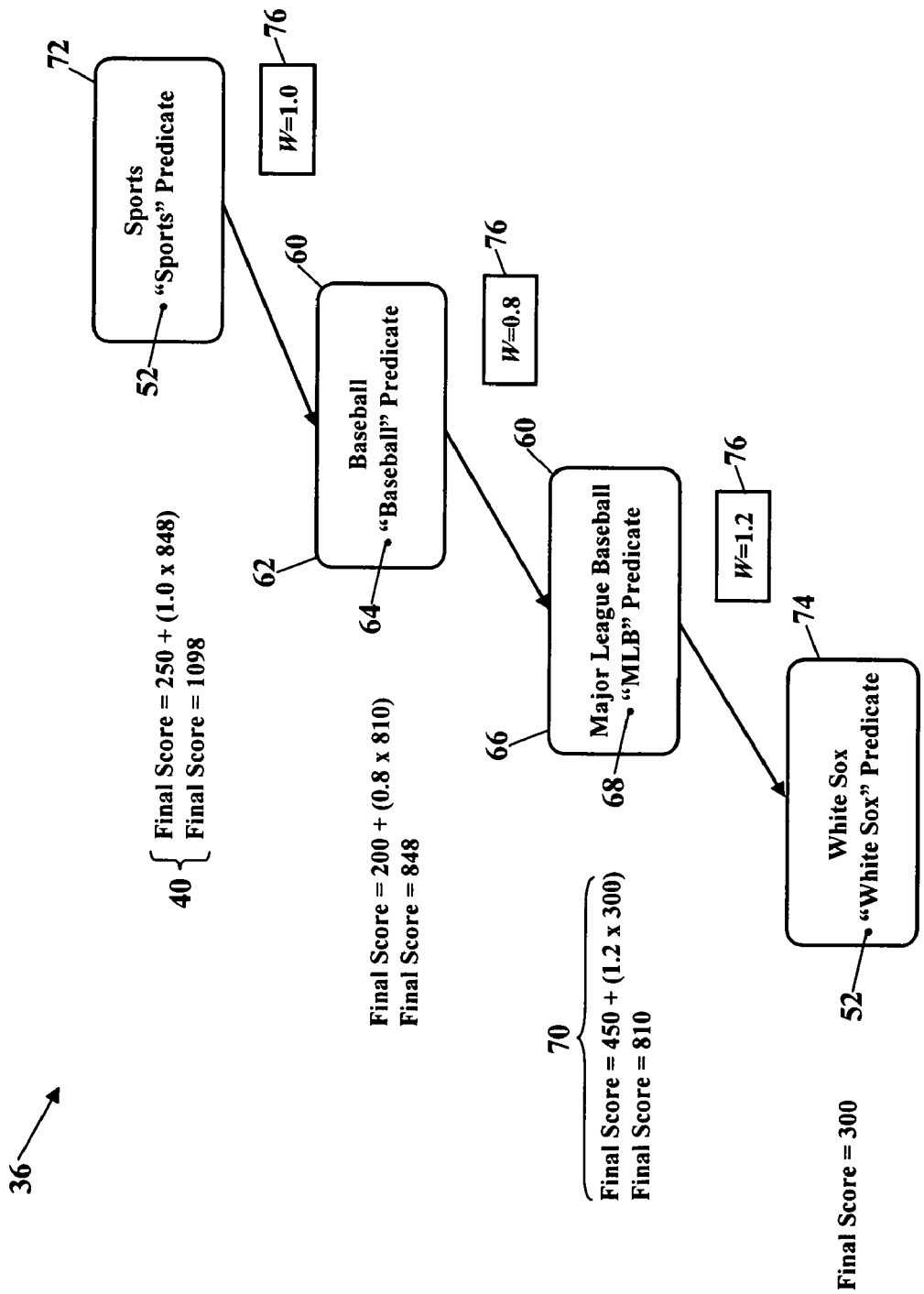

FIGS. 4 and 5 are additional schematics illustrating the ontology 36 of interest. FIG. 4 again illustrates the simple sports-oriented ontology shown in FIG. 3. Here, however, FIG. 4 also illustrates computation of the score 40, according to the scoring algorithm 54. Recall the third party includes the scoring algorithm 54 with the characterization query 34 (shown, respectively, as reference numerals 54 and 34 in FIG. 2). The profile agent applies the scoring algorithm to produce the score (shown, respectively, as reference numerals 24, 54, and 40 in FIG. 2). The profile agent uses the scoring algorithm and the ontology 36 of interest to generate an ontological score of the target system. The score may be a list of the ontological nodes with each node's associated score. The score may be the only artifact sent back to the third party—the profile agent may not divulge the exact metadata collected by the metadata collection agent (and stored within the metadata repository 32).

In another aspect of the present invention, the score is may generated in a two-step process. In a first step the profile agent computes a raw score 70 for each ontological node 60. Each node's raw score 70 is a sum of applying the scoring algorithm to the results of each predicate associated with the node. In this aspect the scoring algorithm is a simple string equation. The scoring algorithm, however, may have any structure and/or language, such as MathML or OpenMath. In addition, the third party requestor may supply a scoring algorithm in the form of mobile executable code (e.g., Java byte code). Suppose the scoring algorithm is defined as score=(node depth)*(# of hits), so that the score is related to the number of website "hits" or visits. Here a "Sports" node 72 occupies a first level, the "Baseball" node 62 occupies a second tier, and the "Major League Baseball" node 66 occupies a third level or tier. The "Major League Baseball" node 66 thus has a depth value of three (3). If one of the "Major League Baseball" node's predicates resulted in fifty (50) hits, then the score for this predicate is 150 (or 3×50). If the "http://%.mlb.com/%" predicate resulted in 100 hits, the score for that predicate is 300 (3×100). The "Major League Baseball" node 66 thus has a raw score of 150+300=450.

FIG. 4 also illustrates raw scores for other nodes in the ontology 36 of interest. Suppose a "White Sox" node 74 has a raw score of 300, and the upper tier "Baseball" node 62 has a raw score of 200. A top tier or parental node "Sports" 72 has a computed raw score of 250. Each node on the ontology 36 of interest thus has a corresponding raw score (assume, for simplicity, that nodes eluded to by ellipses have raw scores of zero). The reader may now understand that, in this example, the further into the ontological tree, the more the third party refines and characterizes interests. The ontology 36 of interest, of course, may be defined and scored in any fashion that suits the third party requestor.

FIG. 5 illustrates a second step for computing the final score 40. Here the profile agent propagates scores up the ontological hierarchy. A parent node's final score is its associated raw score added to the sum of the scores of its children nodes. A child node's score may optionally be modified using weighting factors 76 associated with the semantic relationships. Each weighting factor 76 affects a relationship between nodes in the ontology. FIG. 5 illustrates each node on the ontology 36 of interest, each node's raw score, each node's associated weighting factor, and each node's final score. Again, for simplicity, nodes eluded to by the ellipses have raw scores of zero and do not factor into the score. The profile agent thus produces the following final scores:

Sports: 1098
Baseball: 848
Major League Baseball: 810
White Sox: 300

The score may also include the intermediary results that produced the final score. For example, the nodal result may include the number of hits for each predicate. The third party requestor may even specify how the scores are filtered or truncated to limit or condense the returned results. The third party, for example, may instruct the profile agent to only return the top ten nodal scores. The third party may additionally or alternatively specify that only scores greater than a certain value need be returned.

Figure 6:
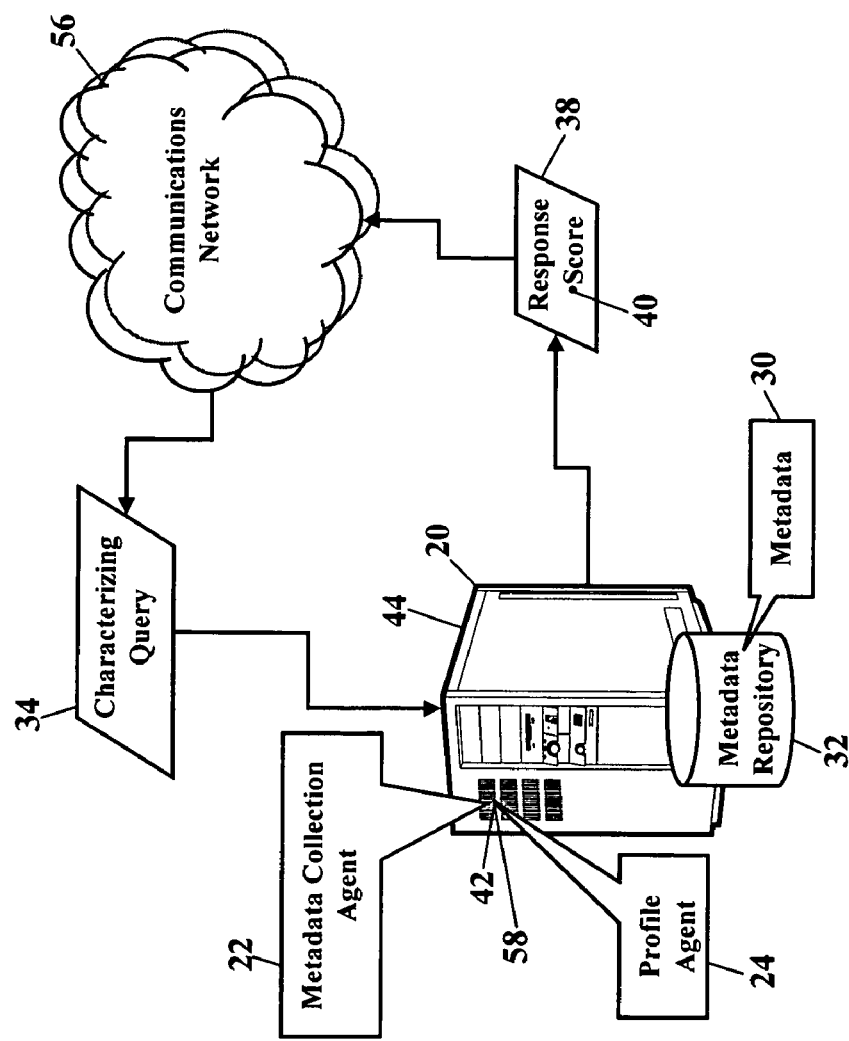
FIG. 6 is a schematic illustrating the metadata collection agent.

FIG. 6 is a schematic illustrating the metadata collection agent 22. Here the metadata collection agent 22 is shown stored within the memory of the target system 20. When a user of the target system 20 uses, acquires, and/or selects content, the metadata collection agent 22 collects the metadata 30 associated with those content selections. The metadata collection agent 22 then stores that collected metadata 30 in the metadata repository 32. The metadata collection agent 22 may constantly, instantaneously, or periodically update the metadata repository 32. The collected metadata 30 may comprise content metadata and/or behavioral information. This behavioral information may include such as frequency and/or length of use (such as how often a file is accessed or how long a song is played). This behavioral information may include calendar or time information describing dates and times of access or use. The metadata repository 32 may include simple keyword value pairs and/or formal data structures that are more optimal for a specific predicate language. The behavioral information adds more context behind the user's content, thus allowing the third party to refine their characterization of the target system 24. The metadata 30 may additionally or alternatively be stored in a distributed fashion within one or more communications devices. The metadata 30 may additionally or alternatively be stored in a distributed fashion within one or more peer systems operating in a peer-to-peer network.

Figure 7:
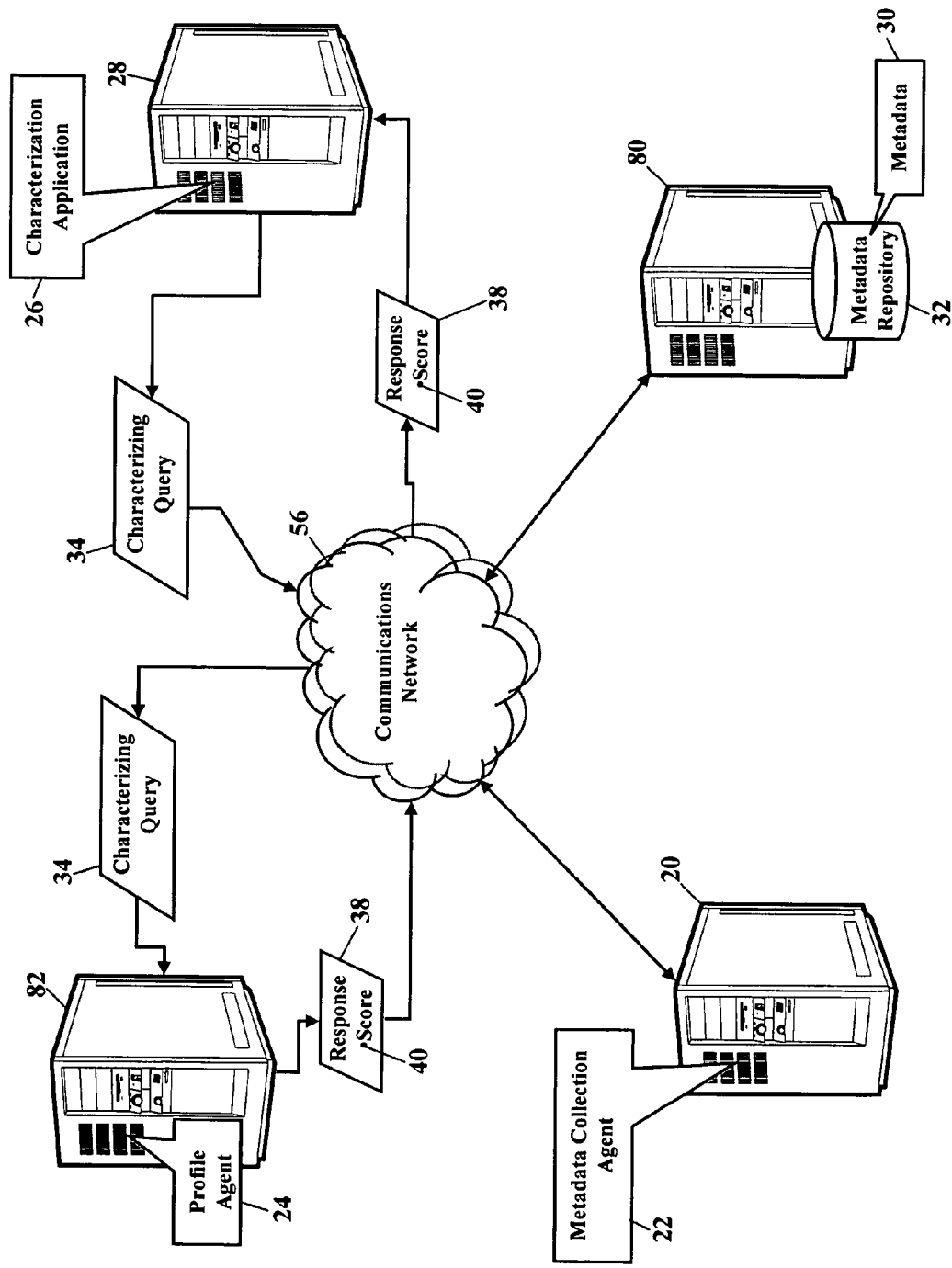
FIG. 7 is a schematic illustrating an alternative operating environment.

FIG. 7 is a schematic illustrating an alternative network operating environment. Here the profile agent 24 and the metadata repository 32 are remotely stored from the target system 20. That is, the profile agent 24 and the metadata repository 32 need not be co-located with the target system 20. The metadata repository 32 may be maintained in memory of a metadata server 80, while the profile agent 24 stores in memory of a profile server 82. Whenever the target system 20 generates the metadata 30, that metadata 30 is sent to the metadata repository 32 in the metadata server 80. When a third party wishes to characterize the target system 20, the characterizing application 26 sends the characterization query 34. The characterization query 34 communicates via the communications network 56 to the profile agent 24 in the profile server 82. When the profile agent 24 receives the characterization query 34, the profile agent 24 may also receives the third party's ontology of interest, associated predicates, and the scoring algorithm (shown, respectively, as reference numerals 36, 52, and 54 in FIG. 2). The profile agent 24 then queries the metadata repository 32 for the predicates associated with the third party's ontology of interest. The metadata server 80 returns a metadata response that comprises the query results. The profile agent 24 then applies the scoring algorithm to produce the score 40. The profile agent 24 then sends the response 38 to the characterizing system 28, and the response 38 includes the score 40. The score 40 represents how well the collected metadata 30 matches the ontology of interest, as defined by the scoring algorithm.

Figure 8:
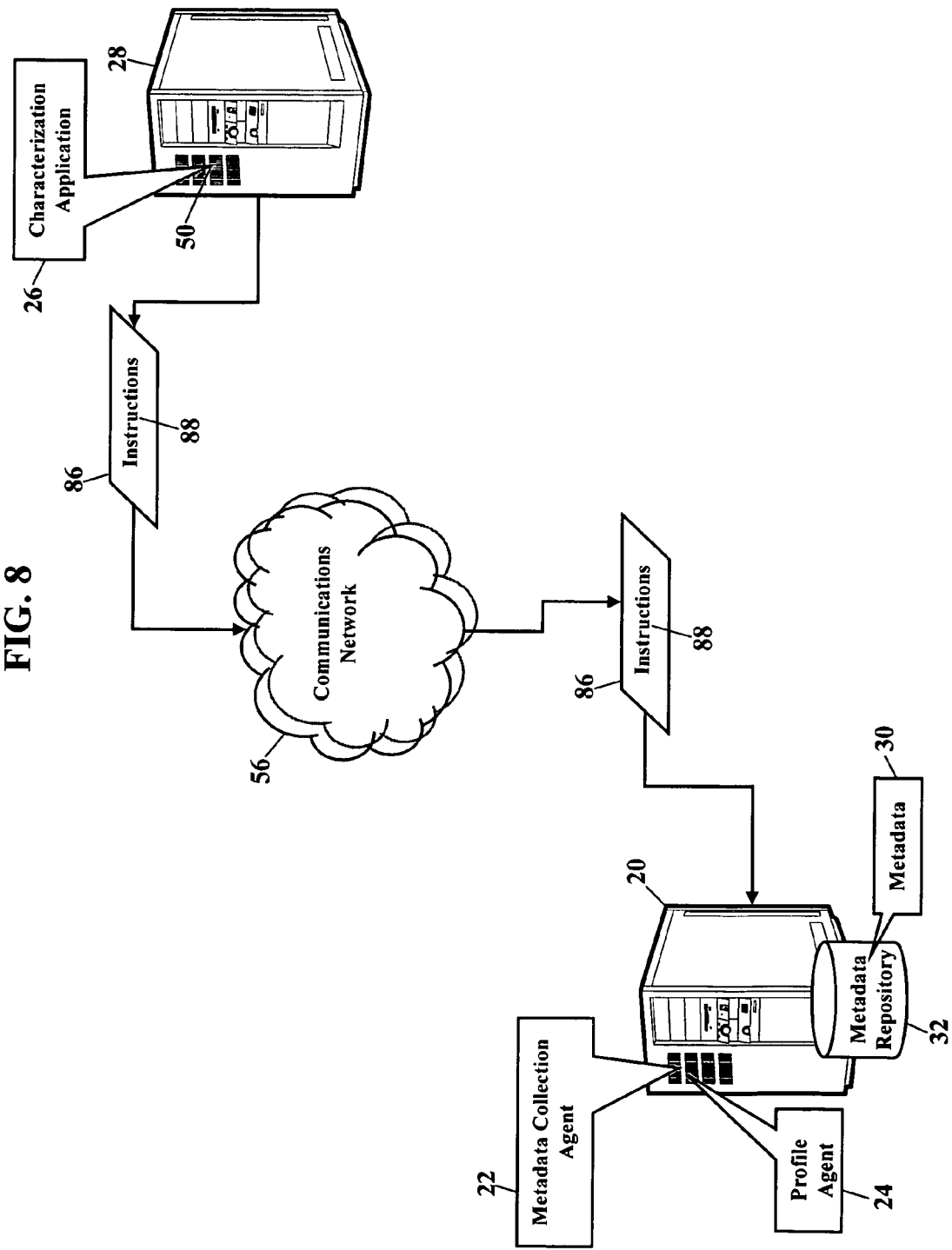
FIG. 8 is a schematic illustrating third party personalization of the target system.

FIG. 8 is a schematic illustrating third party personalization of the target system 20, according to still more aspects of the present invention. Here the characterizing system 28 personalizes the target system 20 according to the third party's needs. In previous aspects the metadata collection agent 22 may have autonomously determined what metadata is collected and how that metadata is formatted and stored. Here, however, the third party provides instructions to the metadata collection agent 22. The characterizing application 26, perhaps on behalf of the third party, instructs the characterizing processor 50 to send a message 86 to the metadata collection agent 22. The message 86 communicates via the communications network 56 to personalize the target system 20 according to the third party's ontology of interest. That is, the message 86 includes instructions 88 that suggest how the metadata collection agent 22 processes the user's metadata 30. The instructions 88 may describe what metadata is preferred by the third party and/or how that metadata is formatted. The instructions 88 may specify how the metadata is obtained and/or recorded. The third party requestor, for example, may offer the instructions 88 so that their queries may be quicker and/or simpler. The third party need not query according to only one version of how the metadata is stored. The third party requestor may use the instructions 88 to specify only their preferred metadata, how that preferred metadata is collected, and how that preferred metadata is formatted. The instructions 88 thus configure the metadata collection agent 22 to more optimally provide a meaningful score.

Figure 9:
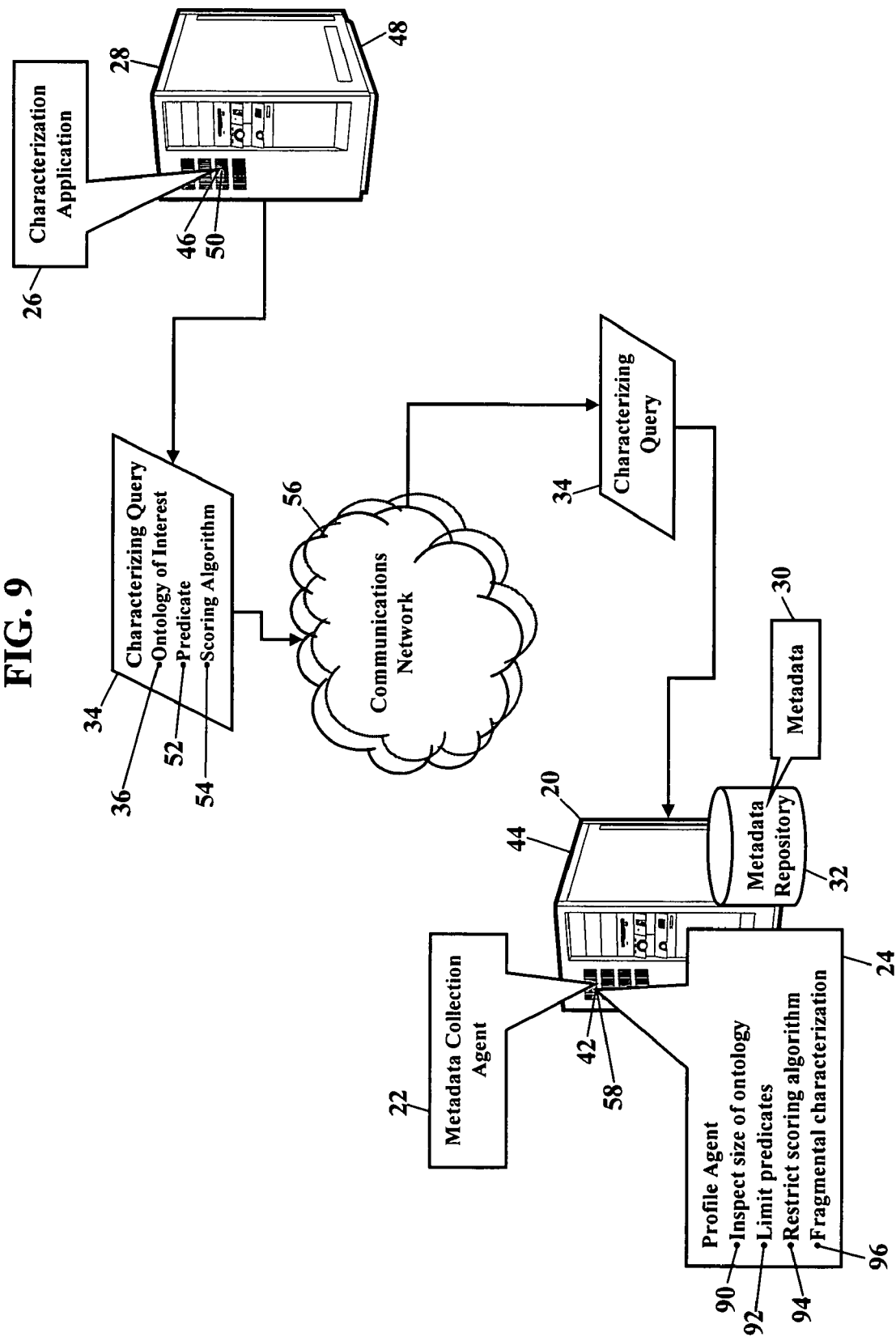
FIG. 9 is a schematic illustrating characterization constraints.

FIG. 9 is a schematic illustrating characterization constraints. Here the profile agent 24 may impose constraints when the target system 20 is characterized. As the above paragraphs have mentioned, some ontologies may be large and/or their associated nodal predicates may be complicated. Large third party websites, such as AMAZON® and EBAY®, may have complex ontologies and predicates in order to finely characterize a user's interests. The profile agent 24 may require minutes, hours, or even days to process and complete such complex characterizations. Moreover, such complexity may compromise the performance of other applications operating on the target system 20. For whatever reasons, then, the profile agent 24 may impose constraints on the characterization.

The user, for example, may restrict the size of the ontology of interest. When the characterization query 34 is received, the profile agent 24 may perform an inspection 90 for some measure of the size of the ontology 36 of interest. The profile agent 24 may inspect the file or byte size of the ontology 36 of interest. The profile agent 24 may inspect and determine the number of levels or tiers within the ontology 36 of interest. The profile agent 24 may inspect and determine the number of nodes within a tier or within the entire ontology 36 of interest. The profile agent 24 may even estimate the time of characterization and compare to a threshold time. Whatever the profile agent 24 may measure, the profile agent 24 may restrict the size of the ontology of interest.

The user may restrict the predicates associated with the ontology of interest. As the above paragraphs explained, each node in the ontology of interest may have one or more associated predicates. Each predicate defines some membership requirement for that associated node. The number of predicates may be an accurate measure of complexity. The profile agent 24, then, may impose a limit 92 on the predicates. The profile agent 24, for example, may limit the total number of predicates associated with any ontology. The profile agent 24 may additionally or alternatively impose a limit on the number of predicates associated with any single node in the ontology. The profile agent 24 may additionally or alternatively impose a limit on the complexity of any predicate associated with any node in the ontology.

The user may also impose restrictions 94 on the scoring algorithm. The scoring algorithm, as previously described, may have a complex structure, and this complexity could hinder the performance of the profile agent 24 or the target system 20 itself. So the profile agent 24 may inspect the scoring algorithm 54 and estimate its complexity. The profile agent 24 may measure the bit or byte length of the scoring algorithm and compare to a threshold size. The profile agent 24 may inspect the scoring algorithm 54 for terms, mathematical operations/operands, or mathematical functions that the user has predefined as indicators of complexity. If such predefined indicators are found, the profile agent 24 could reject the scoring algorithm.

The profile agent 24 may only permit fragmental characterization 96. Again, because some third party websites, such as AMAZON® and EBAY®, may have complex ontologies and/or predicates, the profile agent 24 may only permit a limited number of characterizing "sniffs." That is, the profile agent 24 only permits the third party to send a limited number of small or broadly defined ontologies. The profile agent 24, for example, may limit a third party's ontology to three (3) nodes. The third party, then, may choose to send a limited ontology (such as only the nodes "Sports," "Music," and "Books"). Should the target system 20 then have a high score in the "Sports" node, the profile agent 24 may then permit a finer characterization using the entire ontology fragment underneath the "Sports" node. Because the profile agent 24 may limit the total number of queries, each third party must judiciously and wisely characterize the target system 20.

The profile agent 24 may impose the characterization constraints during a session. The profile agent 24 and the third party's characterizing system 28 may establish a session to enable a sequence of characterization requests. Session initialization includes negotiating the amount of requests and predicate searches, a duration of any characterization request, transport level security, and any other session-oriented parameters. The profile agent 24 can use the session to "throttle" a particular third-party and to prepare the metadata repository 32 for particular types of queries. The session allows the third party's characterization application 26 to efficiently scope its characterization process, thus abiding by the profile agent's constraints.

Figure 10:
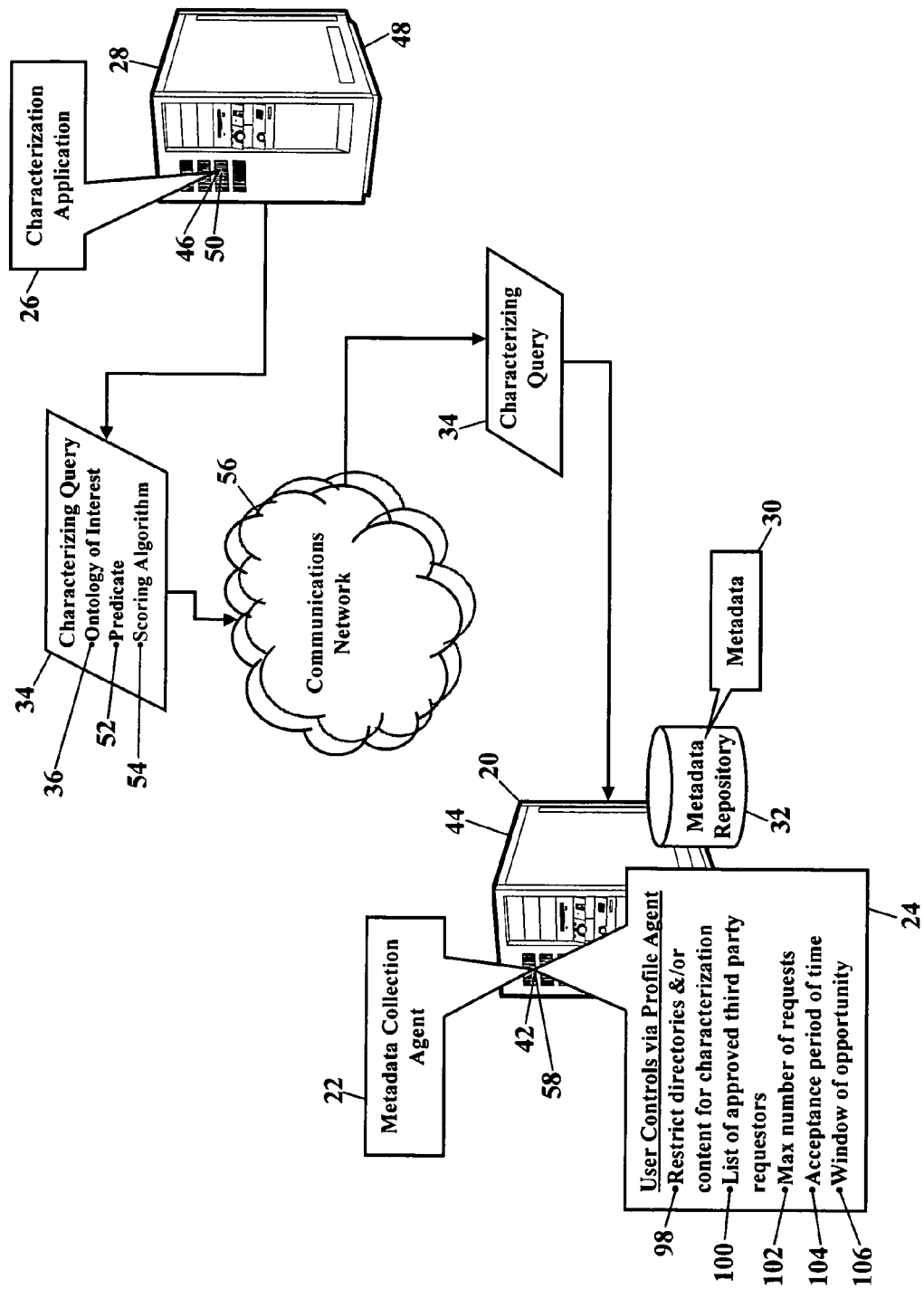
FIG. 10 is a schematic illustrating user controls.

FIG. 10 is a schematic illustrating user controls, according to even more aspects of the present invention. Here the user of the target system 20 may establish restrictions 98 on the directories and/or content that are available for characterization. The user may control what content is processed, by either the profile agent 24 and/or the metadata collection agent 22, based on regular expressions or other query/filter languages. The profile agent 24 and/or the metadata collection agent 22, for example, may permit the user to approve or deny third parties. The user, for example, may enter a list 100 of those third parties that are approved for characterization requests. Any third party requestor not on the list would not be permitted to characterize the target system 20. The user may establish a relationship with approved third parties, thus permitting characterization by those third parties. The user may also specify the maximum number 102 of characterization requests that may be received per hour, per day, or per any other time period. The user may even specify an acceptance period 104 of time in which such characterization requests may be accepted. The user may even stagger characterization requests, such that each third party is only permitted a defined window of time in which to characterize the target system 20. Each approved third party, in other words, is assigned a window 106 of opportunity in which their characterization request may be received and processed. Should that third party attempt to characterize outside their assigned window, the request may be denied.

Some examples help explain user controls. Assume the user stores a collection of music in the target system 20. If the user does not want AMAZON® or EBAY® to know of that collection of music, the user may designate that directory or file (representing the collection of music) as inaccessible to either the profile agent 24 and/or the metadata collection agent 22. The metadata collection agent 22, for example, may be prevented from collecting metadata concerning this directory. The profile agent 24 may be prevented from processing characterization requests that seek to characterize this directory. The user may similarly impose controls or restriction on family photos stored on the target system 20. The user may not want third parties to characterize certain directories or files, so the user may impose controls that limit what data may be characterized.

Figure 11:
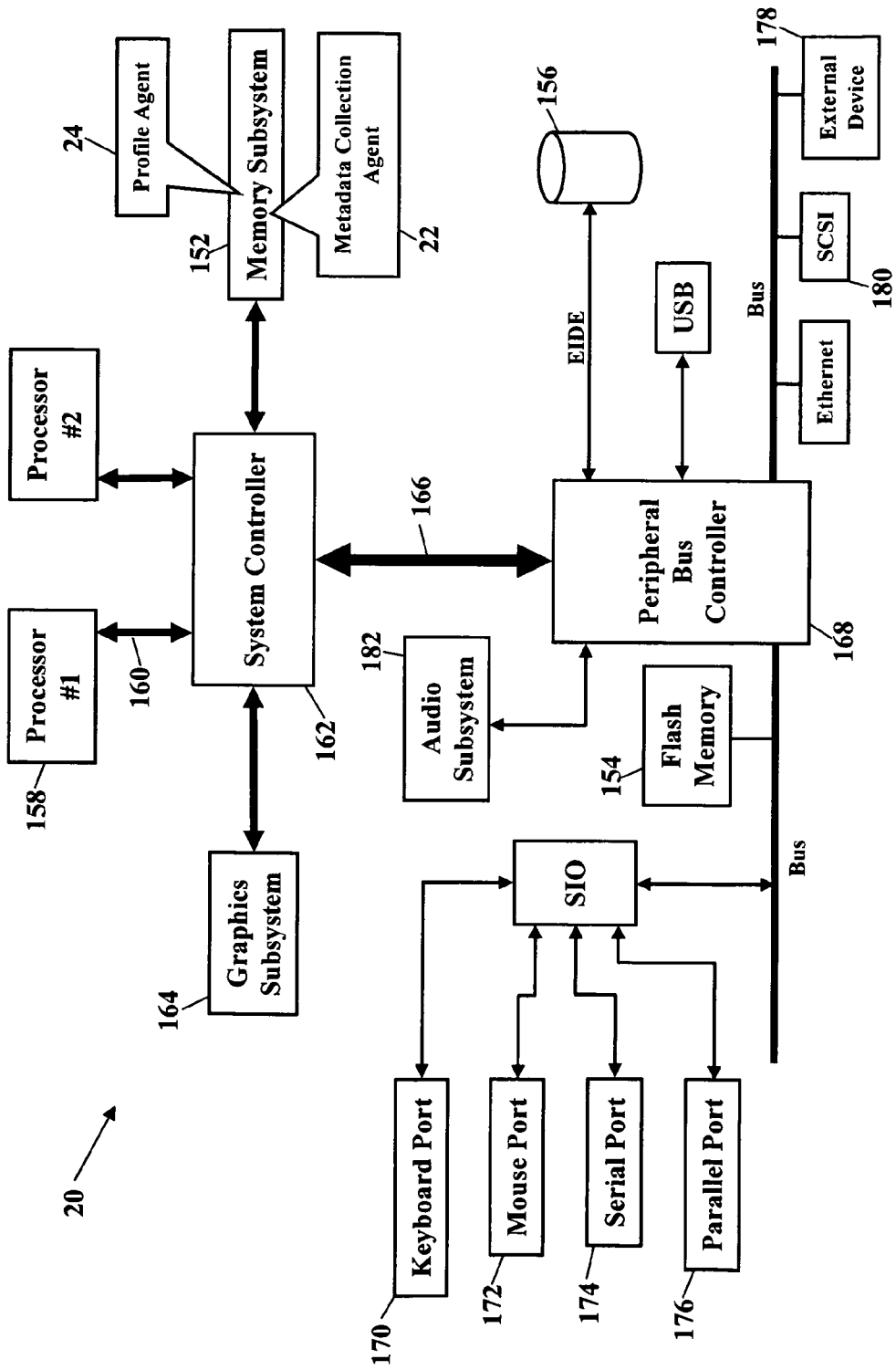
FIG. 11 is a block diagram showing the metadata collection agent and the profile agent residing in the target system.

FIG. 11 depicts another possible operating environment for additional aspects of the present invention. FIG. 11 is a block diagram showing the metadata collection agent 22 and the profile agent 24 residing in the target system 20. FIG. 11, however, may also represent a block diagram of the characterizing system (shown as reference numeral 28 in FIGS. 1-2 & 7-10) or the metadata server and the profile server (shown, respectively, as reference numerals 80 and 82 in FIG. 6). FIG. 11 may also represent a block diagram of any computer, communications device, or processor-controlled device in which the metadata collection agent 22, the profile agent 24, and/or the characterizing application 26 may operate. The metadata collection agent 22 and the profile agent 24 operate within a system memory device. The metadata collection agent 22 and the profile agent 24, for example, are shown residing in a memory subsystem 152. The metadata collection agent 22 and the profile agent 24, however, could also reside in flash memory 154 or peripheral storage device 156. The computer system 24 also has one or more central processors 158 executing an operating system. The operating system, as is well known, has a set of instructions that control the internal functions of the computer system 24. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those of ordinary skill in the art further understand that the program, processes, methods, and systems described herein are not limited to any particular manufacturer's central processor.

Any operating system may be used. Any of the WINDOWS® operating systems, for example, may be suitable (WINDOWS® is a registered trademark of Microsoft Corporation, One Microsoft Way, Redmond Wash. 98052-6399, 425.882.8080, www.Microsoft.com). Other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a user of the computer system 24.

Figure 12:
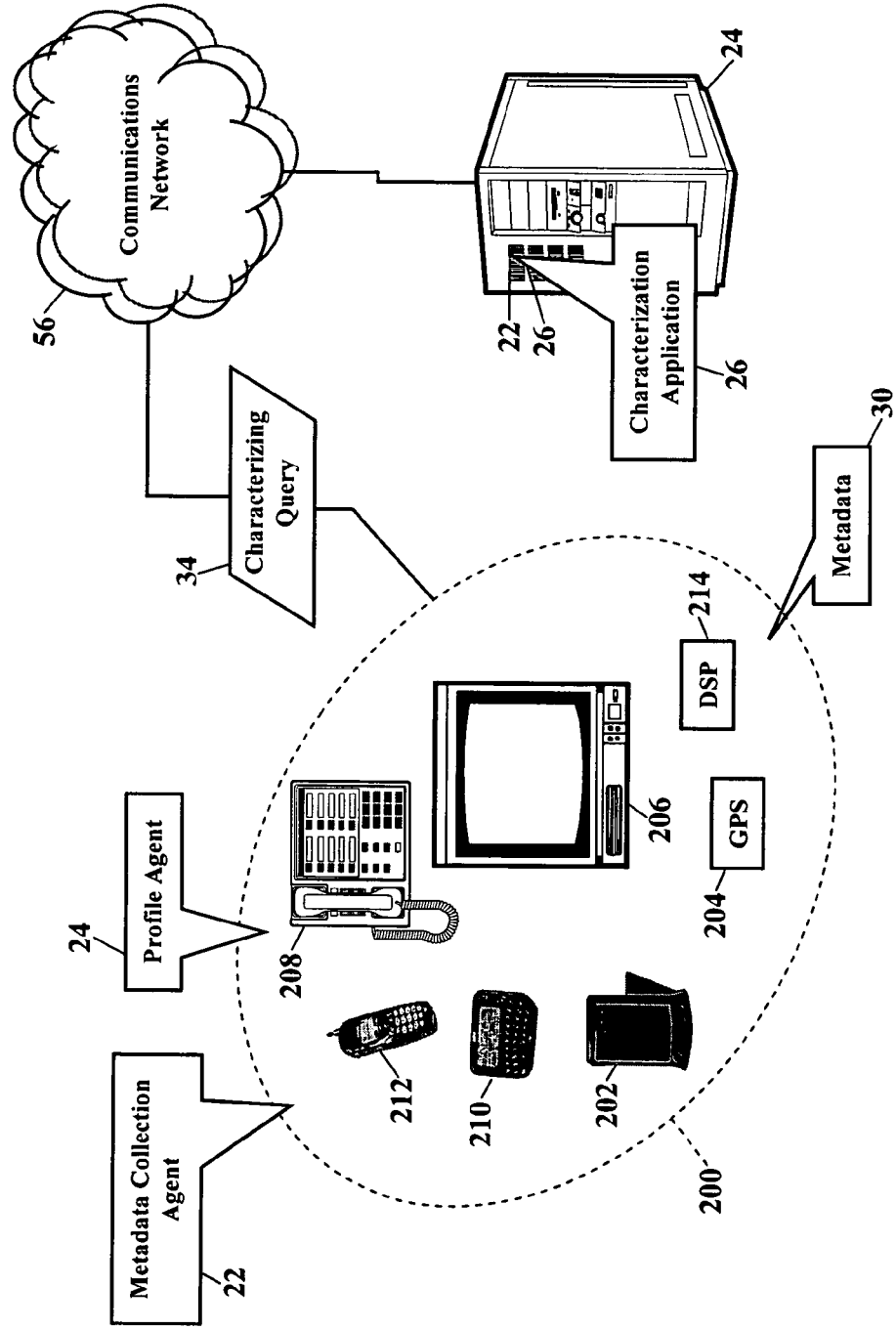
FIG. 12 is a schematic further illustrating various communications devices in which the metadata collection agent and/or the profile agent may operate.

FIG. 12 is a schematic further illustrating various communications devices 200 in which the metadata collection agent 22 and/or the profile agent 24 may operate. Here the metadata collection agent 22 and the profile agent 24 may entirely or partially operate within a personal digital assistant (PDA) 202, a Global Positioning System (GPS) device 204, an interactive television 206, an Internet Protocol (IP) phone 208, a pager 210, a cellular/satellite phone 212, or any computer system and/or communications device utilizing a digital signal processor (DSP) 214. The communications device 200 may also include watches, radios, vehicle electronics, clocks, printers, gateways, and other apparatuses and systems. FIG. 12 also illustrates that the metadata 30 may additionally or alternatively be stored in a distributed fashion within one or more of the communications devices 200.

Moreover, the present invention may be applied regardless of networking environment. The communications network 56 may be a cable network operating in the radio-frequency domain and/or the Internet Protocol (IP) domain. The communications network 56, however, may also include a distributed computing network, such as the Internet (sometimes alternatively known as the "World Wide Web"), an intranet, a local-area network (LAN), and/or a wide-area network (WAN). The communications network 56 may include coaxial cables, copper wires, fiber optic lines, and/or hybrid-coaxial lines. The communications network 56 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

The metadata collection agent 22 and the profile agent 24 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the metadata collection agent 22 and/or the profile agent 24 to be easily disseminated. A computer program product comprises either or both the metadata collection agent 22 and the profile agent 24 stored on the computer-readable medium. The metadata collection agent 22 and the profile agent 24 comprise computer-readable instructions/code for characterizing metadata, as hereinabove explained.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A processor-implemented method of characterizing a target system, comprising:

sending a query from a characterizing system, the query comprising an ontology of interest that describes and represents a domain of interest, a predicate, and a scoring algorithm, wherein the ontology of interest includes a plurality of nodes, each node of the plurality of nodes related to another node of the plurality of nodes, the predicate describing a membership qualification for a node in the ontology of interest;

receiving a response comprising a score at the characterizing system, the score being generated with the scoring algorithm, the score representing an evaluation of the predicate to metadata associated with the target system and how well the metadata matches the ontology of interest;

evaluating the score to characterize the target system, wherein the metadata of the target system is inaccessible to the characterizing system; and accepting that the metadata is inaccessible to a sender of the query.

2. A method according to claim 1, further comprising the step of sending a message to personalize the target system according to the ontology of interest.

3. A method according to claim 1, further comprising the step of sending information that describes what metadata is collected on behalf of a sender of the query.

4. A method according to claim 1, further comprising the step of sending information that describes how the metadata should be formatted according to preferences of a sender of the query.

5. A method according to claim 1, wherein the scoring algorithm applies a weighting factor to a relationship between the plurality of nodes in the ontology.

6. A method according to claim 1, further comprising the step of receiving a characterization constraint from the target system, the characterization constraint restricting at least one of 1) a size of the ontology of interest included in the query, ii) a number of predicates associated with the ontology of interest, and iii) a complexity of the scoring algorithm.

7. A system for characterizing a target system, comprising:
a characterization application stored in memory; and
a processor communicating with the memory,
the processor sending a query, the query comprising an ontology of interest that describes and represents a domain of interest, wherein the ontology of interest includes a plurality of nodes, each node of the plurality of nodes related to another node of the plurality of nodes, a predicate, and a scoring algorithm, the predicate describing a membership qualification for a node in the ontology of interest;
the processor receiving a response comprising a score generated with the scoring algorithm, the score representing an evaluation of the predicate to metadata associated with the target system and how well the metadata matches the ontology of interest;
the processor evaluating the score to characterize the target system, wherein the metadata of the target system is inaccessible to the processor; and
wherein the system accepts that the metadata is inaccessible to a sender of the query.

8. A system according to claim 7, wherein the processor sends a message to personalize the target system according to the ontology of interest.

9. A system according to claim 7, wherein the processor sends information that describes what metadata is collected on behalf of a sender of the query.

10. A system according to claim 7, wherein the processor sends information that describes how the metadata should be formatted according to preferences of a sender of the query.

11. A system according to claim 7, wherein the scoring algorithm applies a weighting factor to a relationship between the plurality of nodes in the ontology.

12. A system according to claim 7, wherein the processor receives a characterization constraint from the target system, the characterization constraint restricting at least one of 1) a size of the ontology of interest included in the query, ii) a number of predicates associated with the ontology of interest, and iii) a complexity of the scoring algorithm.

13. A computer program product comprising a computer-readable medium storing instructions for performing the steps:
sending a query from a characterizing system, the query comprising an ontology of interest that describes and represents a domain of interest, wherein the ontology of interest includes a plurality of nodes, each node of the plurality of nodes related to another node of the plurality of nodes, a predicate, and a scoring algorithm, the predicate describing a membership qualification for a node in the ontology of interest;
receiving a response comprising a score, the score being generated with the scoring algorithm, the score representing an evaluation of the predicate to metadata associated with a target system and how well the metadata matches the ontology of interest;
evaluating the score to characterize the target system, wherein the metadata of the target system is inaccessible to the characterizing system; and
accepting that the metadata is inaccessible to a sender of the query.

14. A computer program product according to claim 13, further comprising instructions for sending a message to personalize the target system according to the ontology of interest.

15. A computer program product according to claim 13, further comprising instructions for sending information that describes what metadata is collected on behalf of a sender of the query.

16. A computer program product according to claim 13, further comprising instructions for sending information that describes how the metadata should be formatted according to preferences of a sender of the query.

17. A computer program product according to claim 13, further comprising instructions for receiving a characterization constraint from the target system, the characterization constraint restricting at least one of 1) a size of the ontology of interest included in the query, ii) a number of predicates associated with the ontology of interest, and iii) a complexity of the scoring algorithm.

* * * * *